Figure 3:
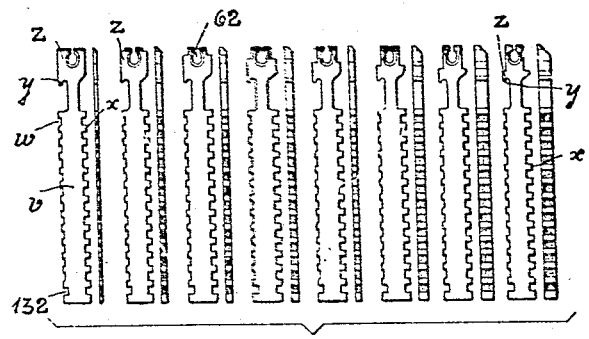

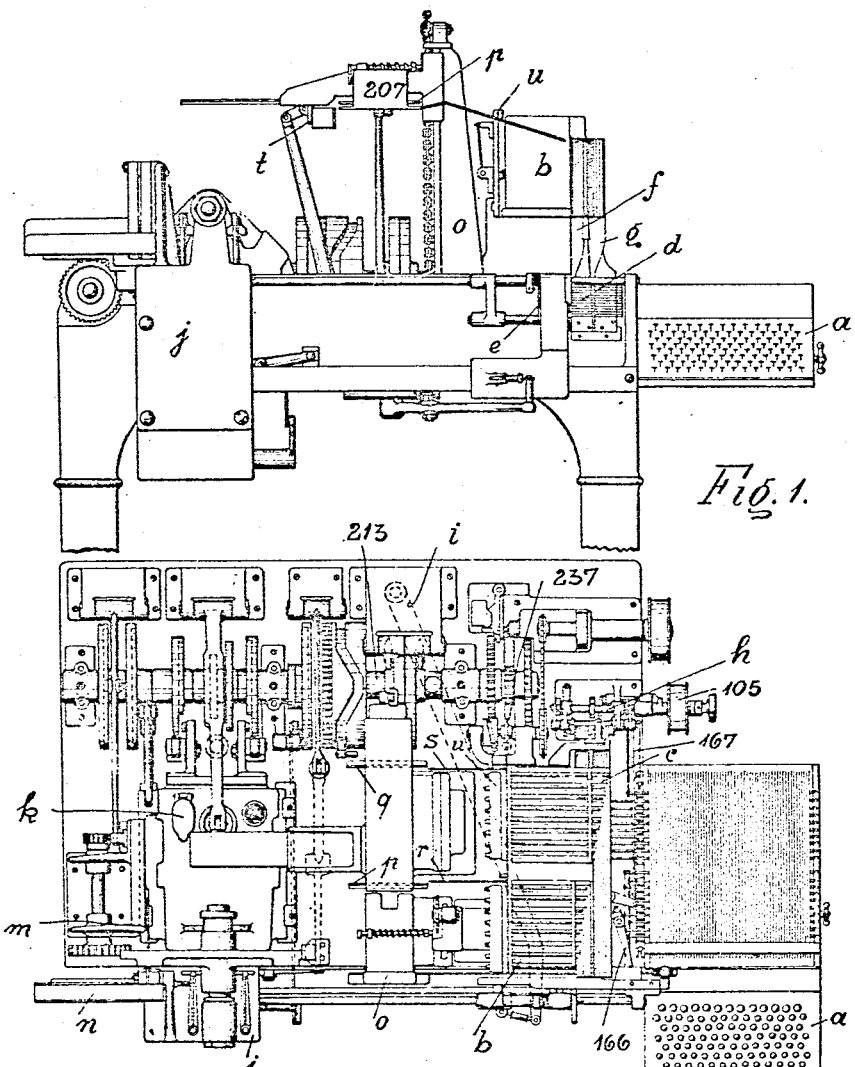

H. DEGENER.
TYPE SETTING AND CASTING MACHINE.
APPLICATION FILED SEPT. 25, 1907.

948,291.

Patented Feb. 1, 1910.

Witnesses:
Paul Wollenberg
Emil Kaysers

Inventor:
Heinrich Degener
by Power Zeigler
Attorney.

H. DEGENER.
TYPE SETTING AND CASTING MACHINE.
APPLICATION FILED SEPT. 25, 1907.

948,291.

Patented Feb. 1, 1910.
17 SHEETS—SHEET 3.

Witnesses:
Paul Wollenberg
Emil Kayser

Inventor:
Heinrich Degener
by Reeves Heigler
Attorney.

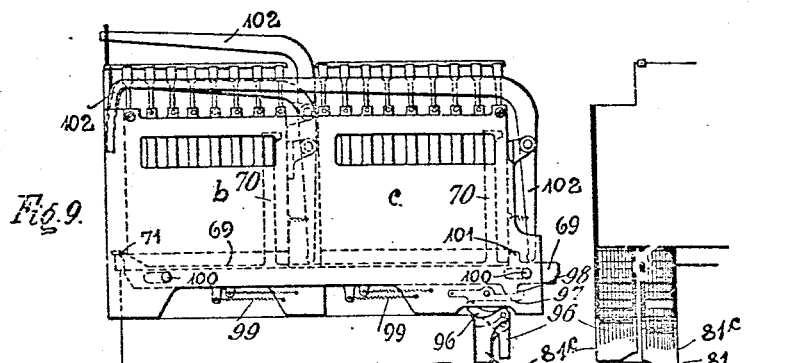
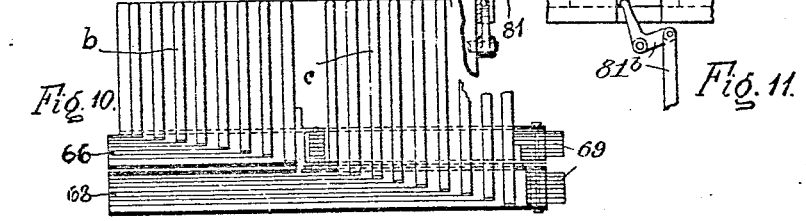
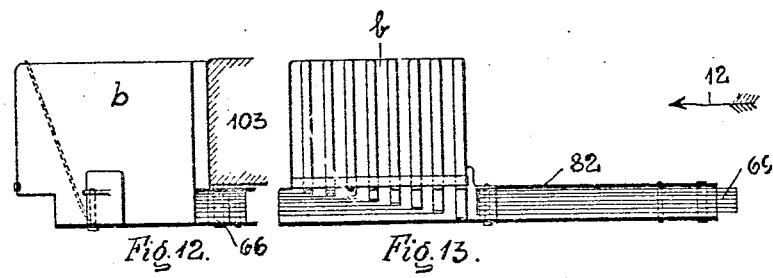
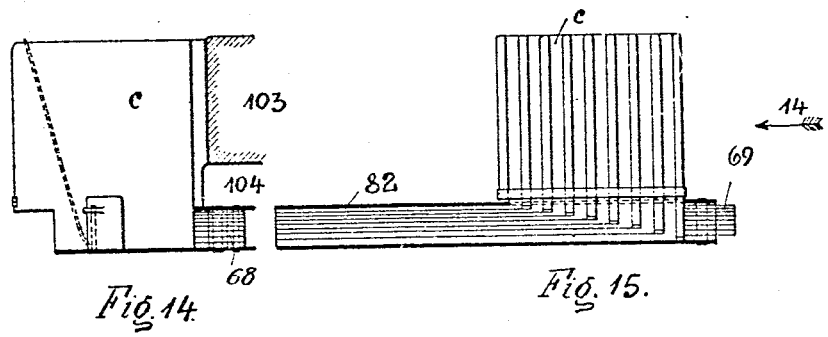

H. DEGENER.
TYPE SETTING AND CASTING MACHINE.
APPLICATION FILED SEPT. 25, 1907.

948,291.

Patented Feb. 1, 1910.
17 SHEETS—SHEET 5.

Witnesses:
Paul Wallenberg
Emil Kayser

Inventor:
Heinrich Degener
by Robert Seifler
Attorney.

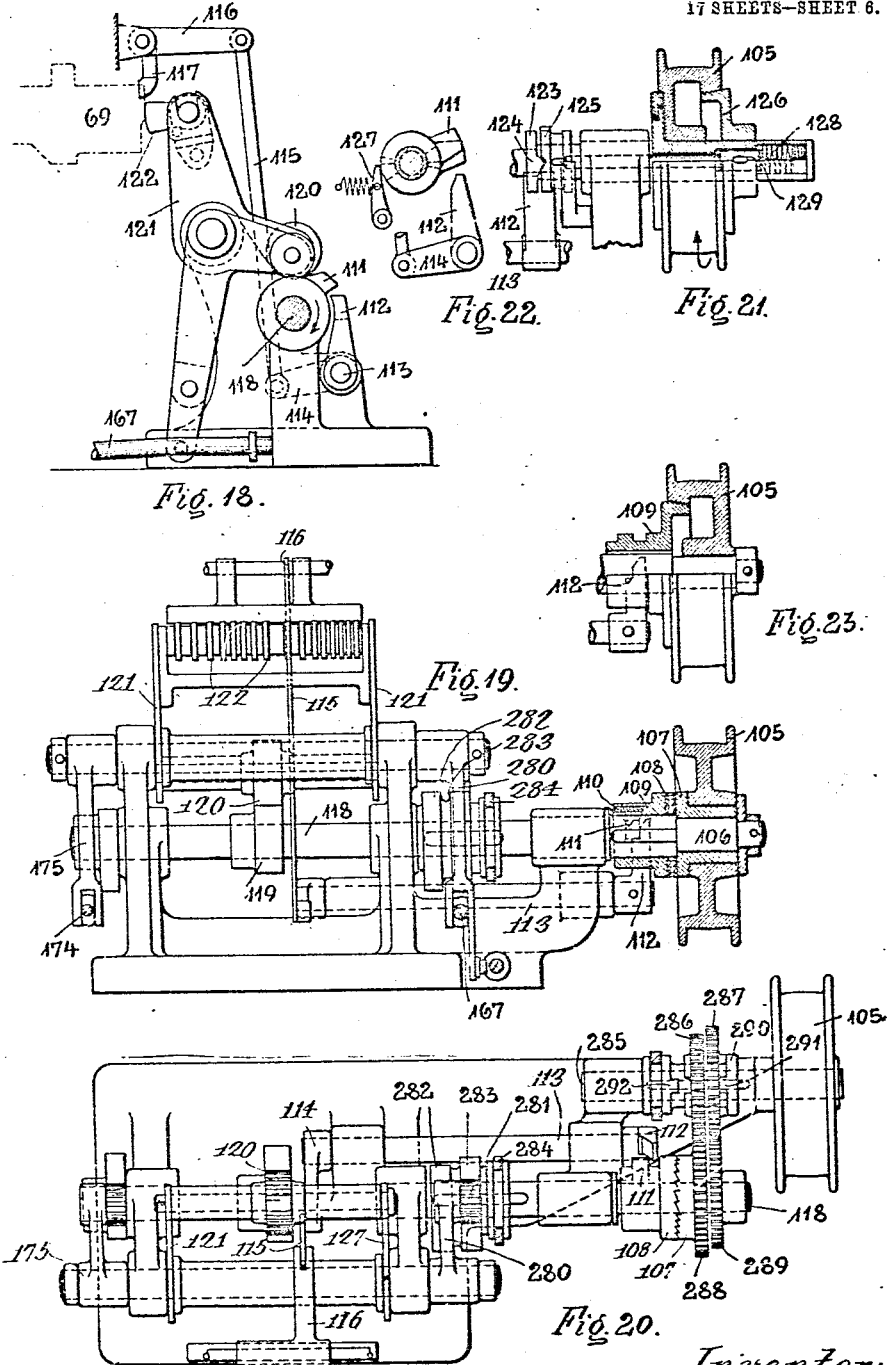

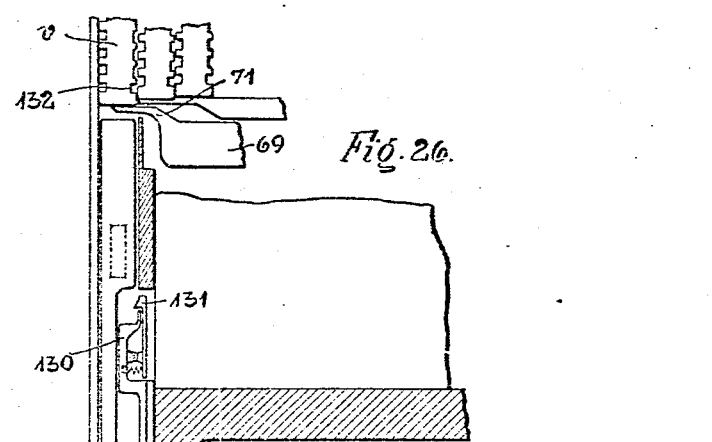
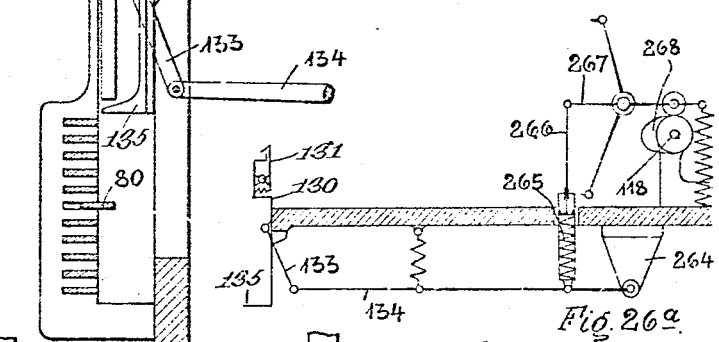
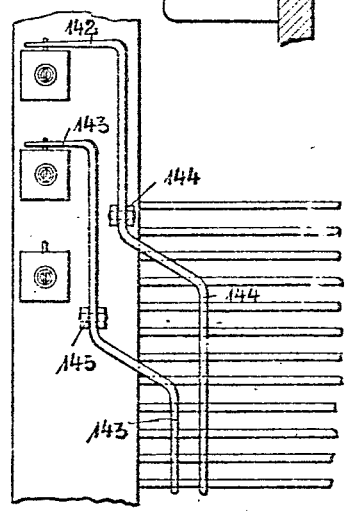
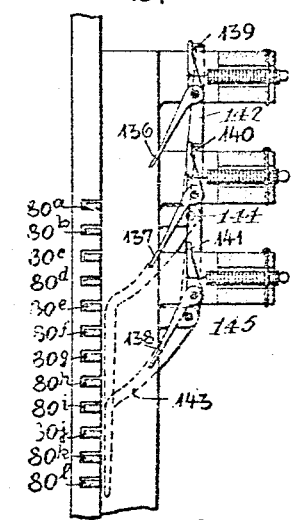

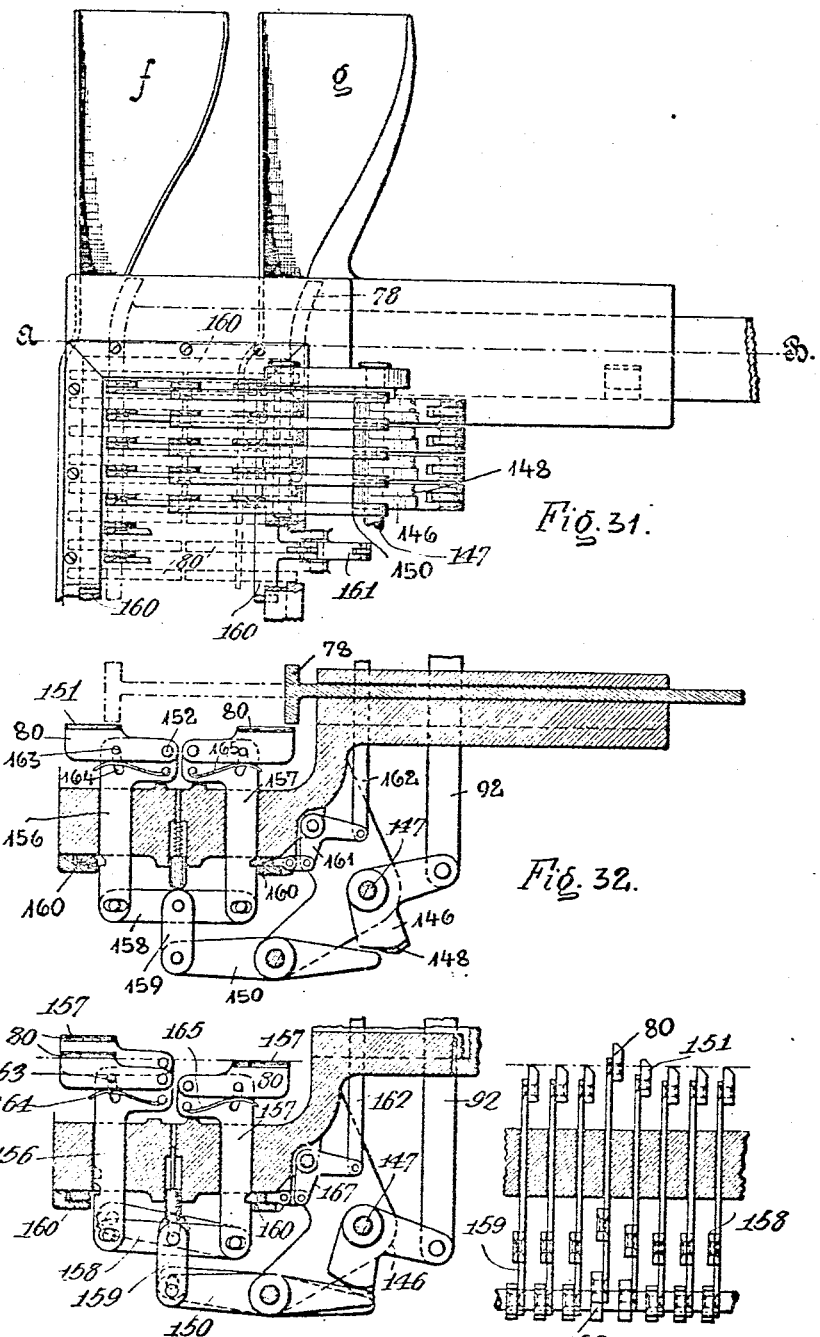

H. DEGENER.
TYPE SETTING AND CASTING MACHINE.
APPLICATION FILED SEPT. 25, 1907.

948,291.

Patented Feb. 1, 1910.
17 SHEETS—SHEET 10.

Witnesses:
Paul Wattenberg
Emil Kayser

Inventor:
Heinrich Degener.
by [signature]
Attorney.

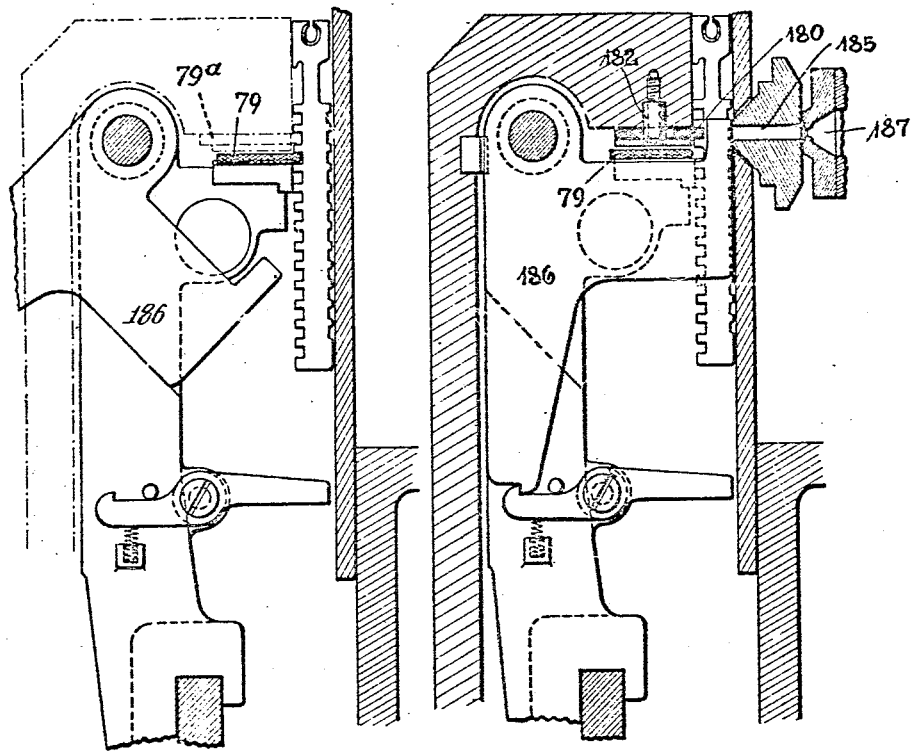
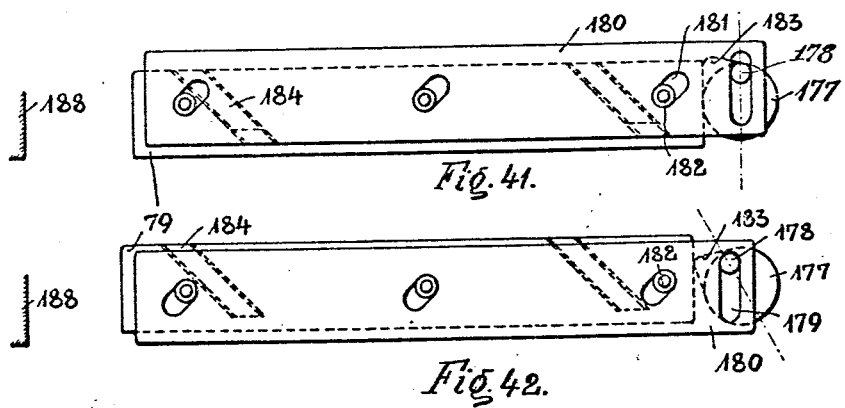

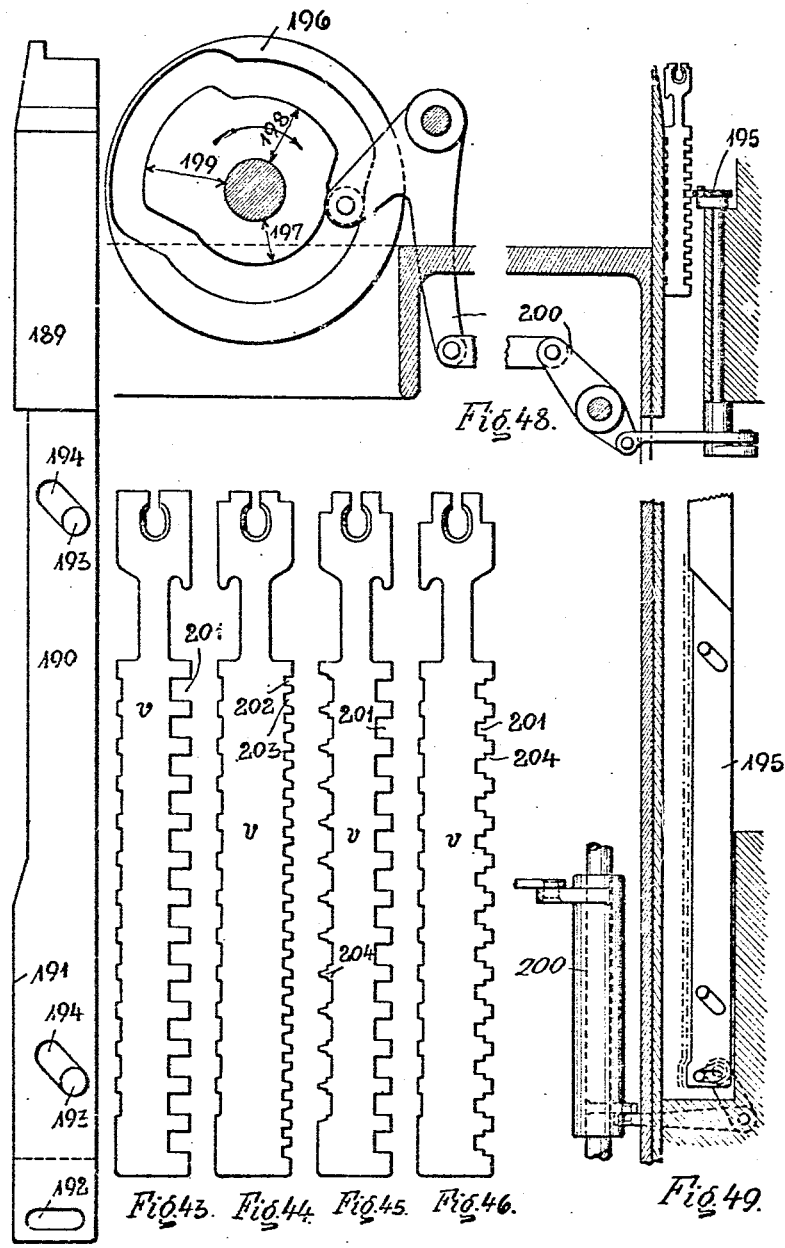

H. DEGENER.
TYPE SETTING AND CASTING MACHINE.
APPLICATION FILED SEPT. 25, 1907.

948,291.

Patented Feb. 1, 1910.
17 SHEETS—SHEET 13.

Witnesses:
Paul Wattenberg
Emil Hayser

Inventor.
Heinrich Degener.
by his Attorney.

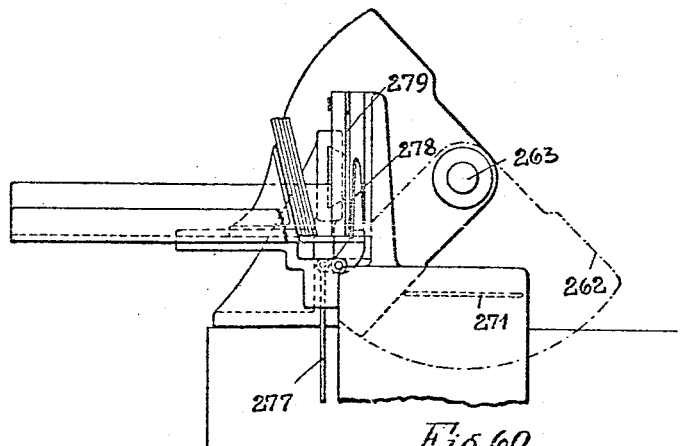
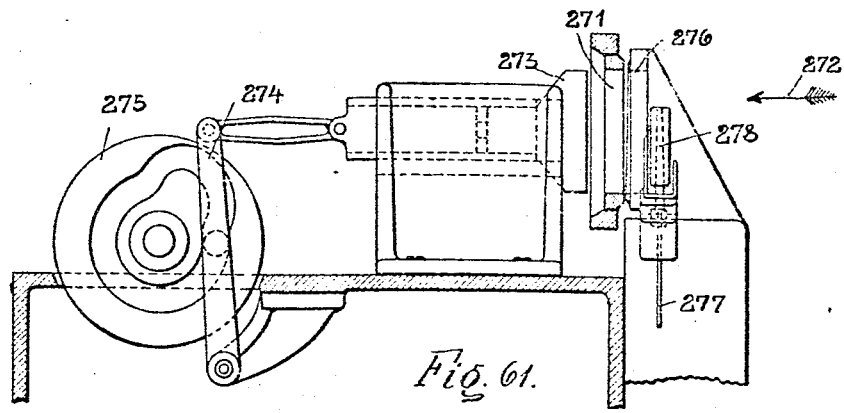

UNITED STATES PATENT OFFICE.

HEINRICH DEGENER, OF BERLIN, GERMANY.

TYPE SETTING AND CASTING MACHINE.

948,291.    Specification of Letters Patent.    Patented Feb. 1, 1910.

Application filed September 25, 1907. Serial No. 394,489.

*To all whom it may concern:*

Be it known that I, HEINRICH DEGENER, a subject of the King of Prussia, German Emperor, and resident of 26 Hollmann street, Berlin, Germany, manager, have invented certain new and useful Improvements in Type Setting and Casting Machines, of which the following is an exact specification.

The present invention relates to those type setting and casting machines known as monoline machines and as described in U. S. Patents Nos. 506198, 605141, 622989, 650296 and 711143. In such machines the intaglio letters are carried by matrix bars, twelve letters being provided of each matrix bar while there are eight different sets of matrix bars. These sets of matrix bars are stored in what is called a magazine. In hitherto known constructions only one kind of letter has been provided on the matrix bars.

The object of the present invention is to enable the use of two sets of type of different kinds such for instance as ordinary type and italics in machines of the monoline type. For this purpose according to the present invention two storing magazines are employed in which the different kinds of type are arranged.

The several operations of the improved machine follow in practically the same sequence as in the known monoline type setting and casting machines. The intaglio letters are formed in matrix bars twelve, or other number being provided on each matrix bar. Eight different kinds of matrix bars are employed so that in all ninety-six different characters are provided. These matrix bars are first released from the magazine and fed into an assembler in the required order to form a line of type, suitable spacing wedges being also fed where required to effect the spacing. The assembled line of matrix bars and spacers are then adjusted and carried to an anvil where the required letters come opposite a mold. The mold is then filled with molten metal sprayed in by a suitable device, after which the mold with the cast line of type therein is moved to a cutting and adjusting device while the line of bars is released from the carriage and the various matrix bars and spacers taken, by means of what is called a distributer, back to their correct chambers in the magazine.

According to the present invention where the machine is intended to work with two kinds or fonts of type, double the number of letter characters and matrix bars are required than has hitherto been used in monoline type setting and casting machines. It is therefore necessary to entirely reconstruct the matrix bars, the magazine and its actuating parts including what is known as the oscillator, the assembling device and the distributing device. In view also of the additional complication to the machine it is necessary to improve the action of the parts so as to avoid wear and excessive friction. The present invention therefore also embodies improvements in the means for detaining matrix bars when they are falling through the guide channels into the assembly room. These detaining devices are necessary in order to prevent the matrix bars springing back after they have been stopped in the correct position to be pushed on to the alining rail.

Also the present invention has for its object an improved alining device for bringing the type into correct line and finally the present invention has for its object to improve the device intended for the ejection of the finished cast line into the carrier.

The improved machine together with modifications of certain of the parts is illustrated in the accompanying drawings in which—

Figure 4:
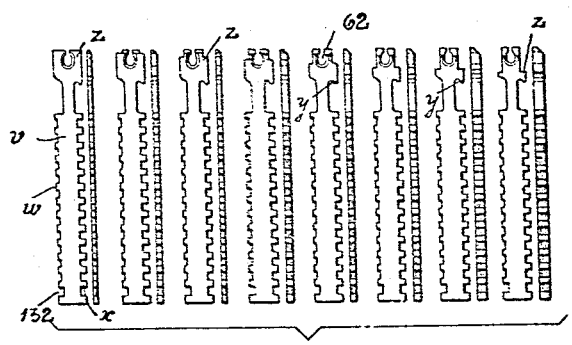
Figure 5:
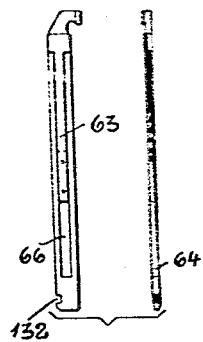
Figure 6:
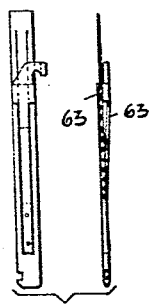
Figure 7:
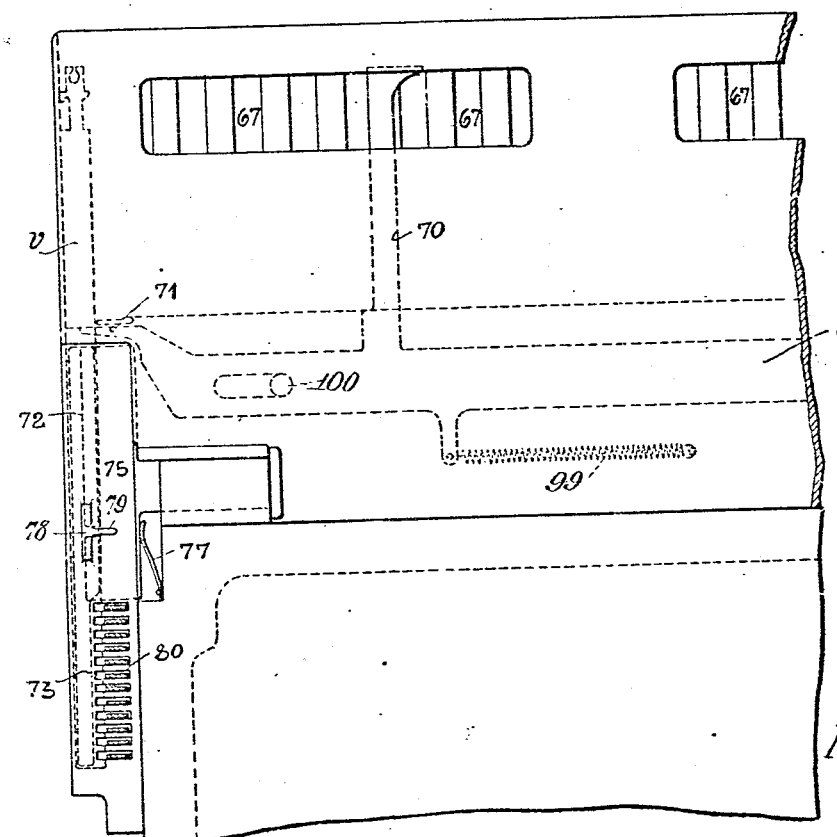
Figure 8:
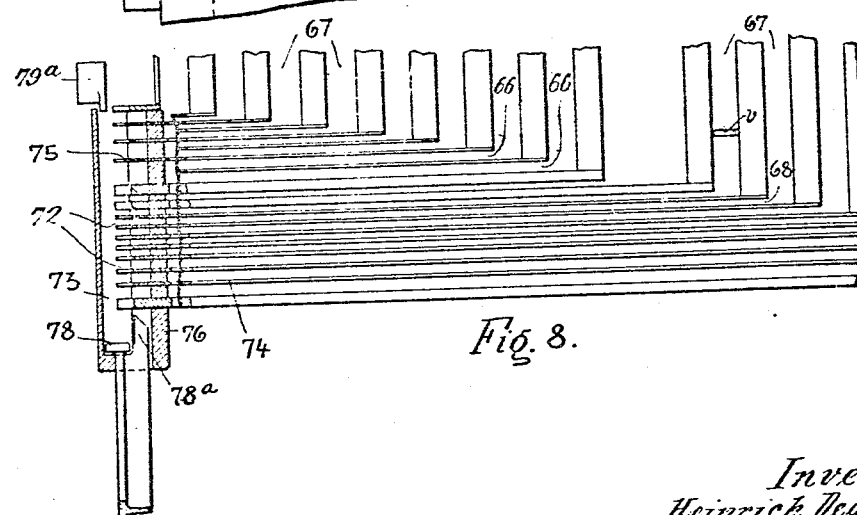

Figure 1 is a front elevation of the machine, Fig. 2 is a plan of the same, Fig. 3 illustrates the matrix bars of one set, Fig. 4 illustrates the matrix bars of another set of type, Fig. 5 shows the spacer with the wedge at its farthest out position, Fig. 6 illustrates the spacer with the wedge pressed in, Fig. 7 is a side elevation of a magazine looking from the right in Fig. 1, Fig. 8 is a plan of the magazine shown in Fig. 7, Fig. 9 is a more complete view of the magazines illustrating the method of action of the delivery gates and the accelerating bars, Fig. 10 is a plan view of the magazines shown in Fig. 9, Fig. 11 is an end view of the same showing how one of the magazines may be put out of operation while the other magazine is being used. Figs. 12–15 show separate views of the magazines, Fig. 12 being a view looking in the direction of the arrow 12, Fig. 13, the magazine is herein shown as though it were laid on its side, and Fig. 13 being a plan of the front magazine, Fig. 14 is a view similar to Fig.

Figure 16:
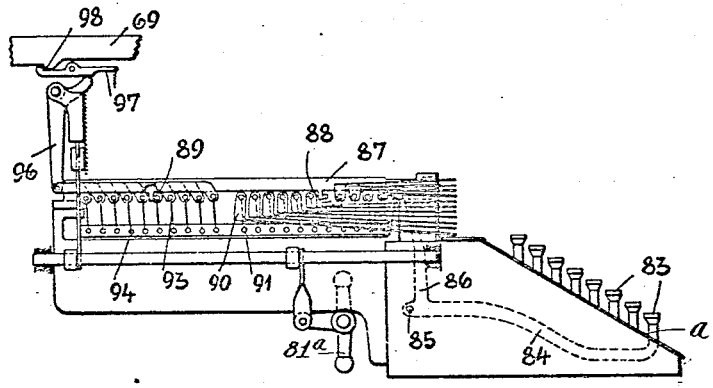
Figure 17:
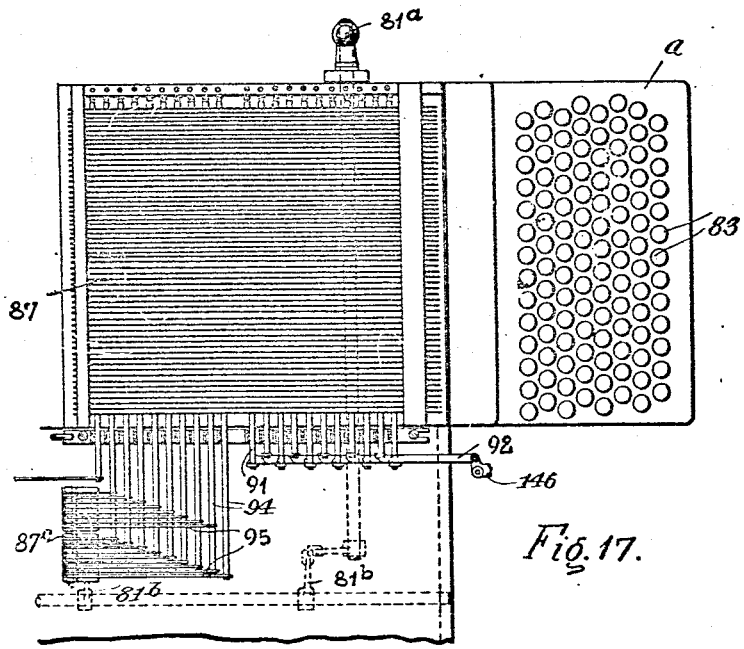
Figure 27:
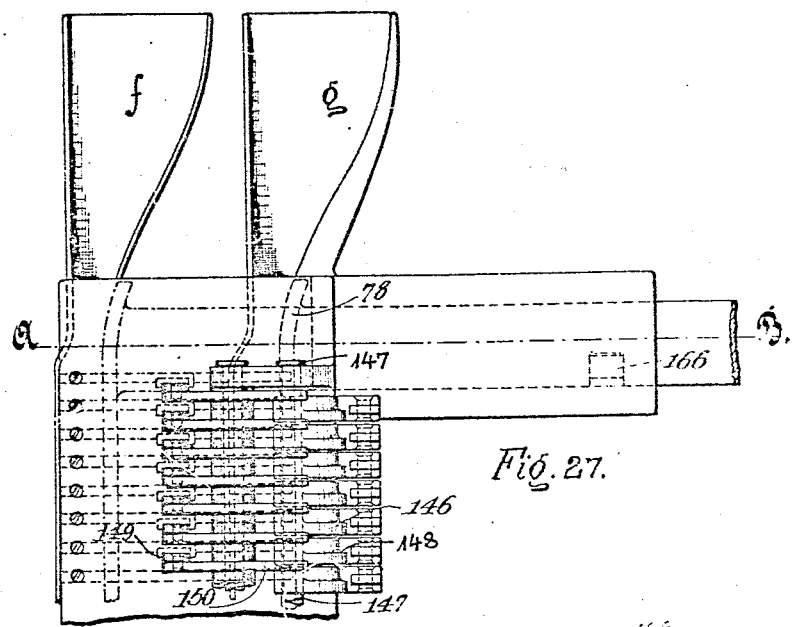
Figure 28:
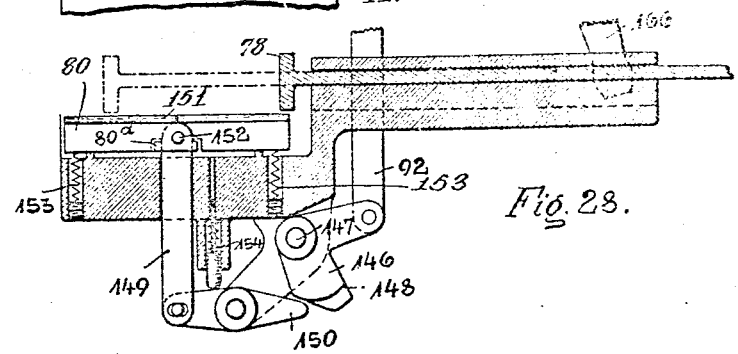
Figures 29, 30:
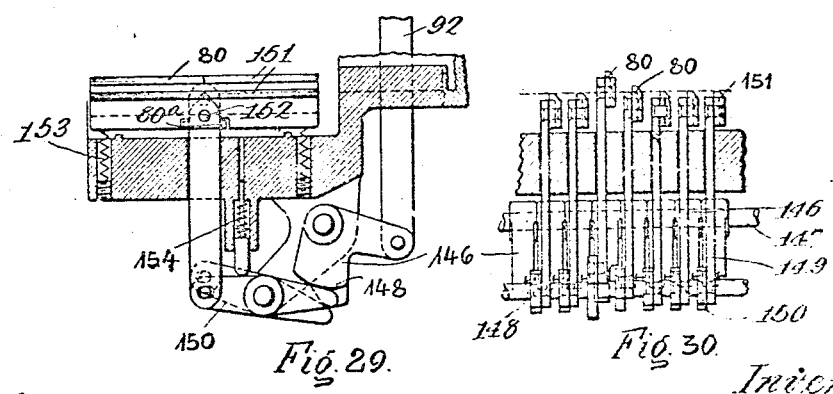
Figure 35:
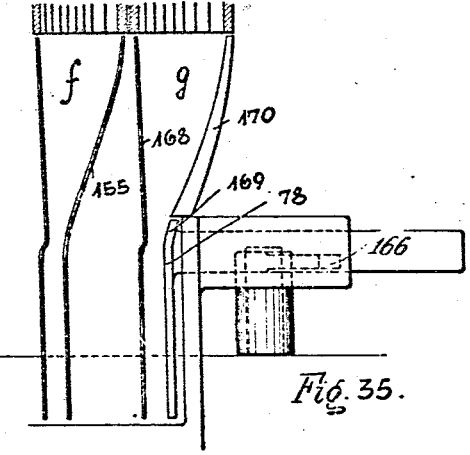
Figures 36, 37:
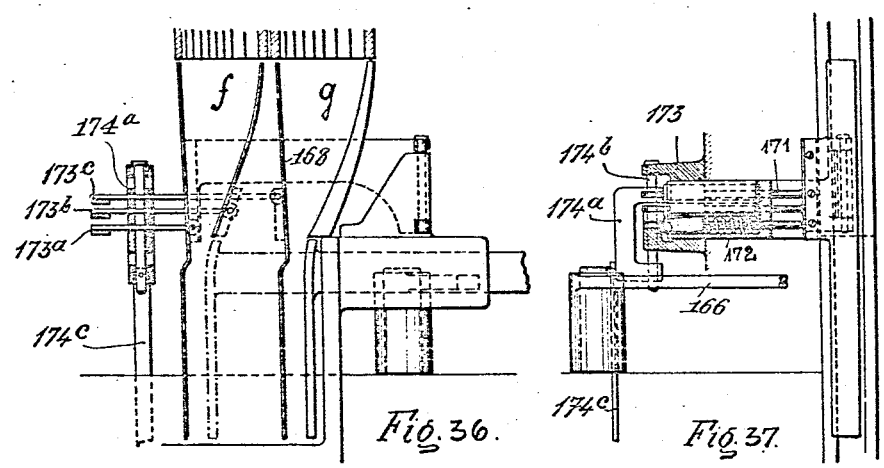
Figure 38:
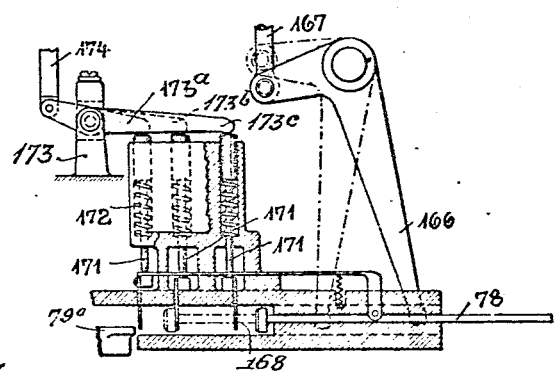
Figure 50:
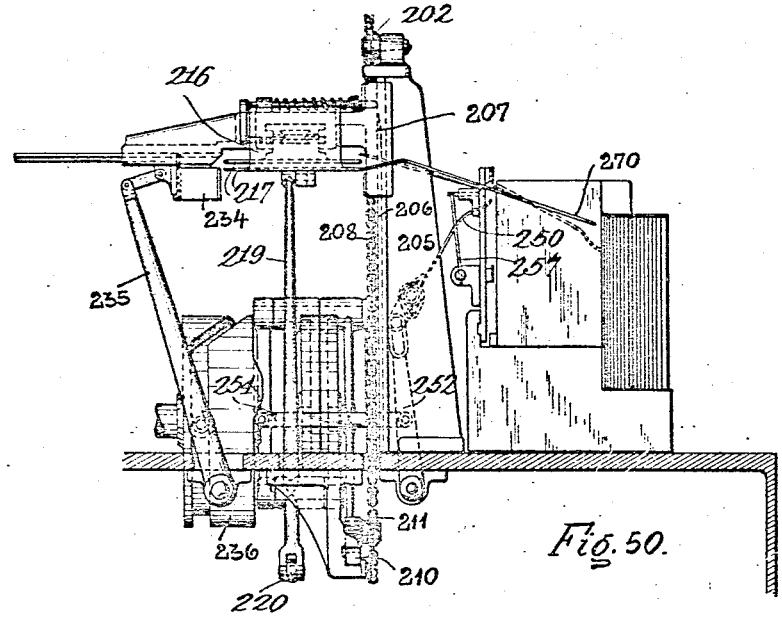
Figures 53, 54, 55:
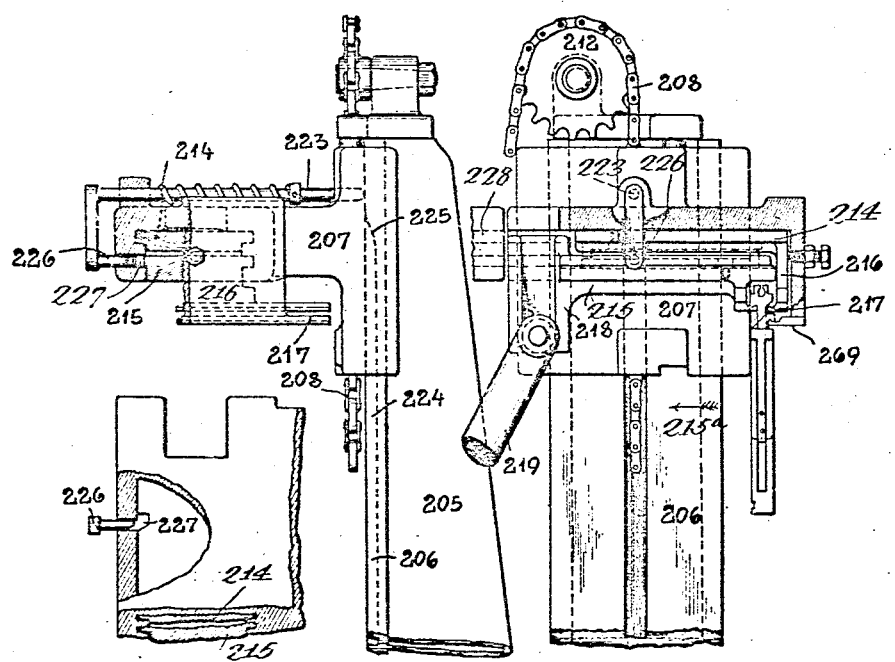
Figure 51:
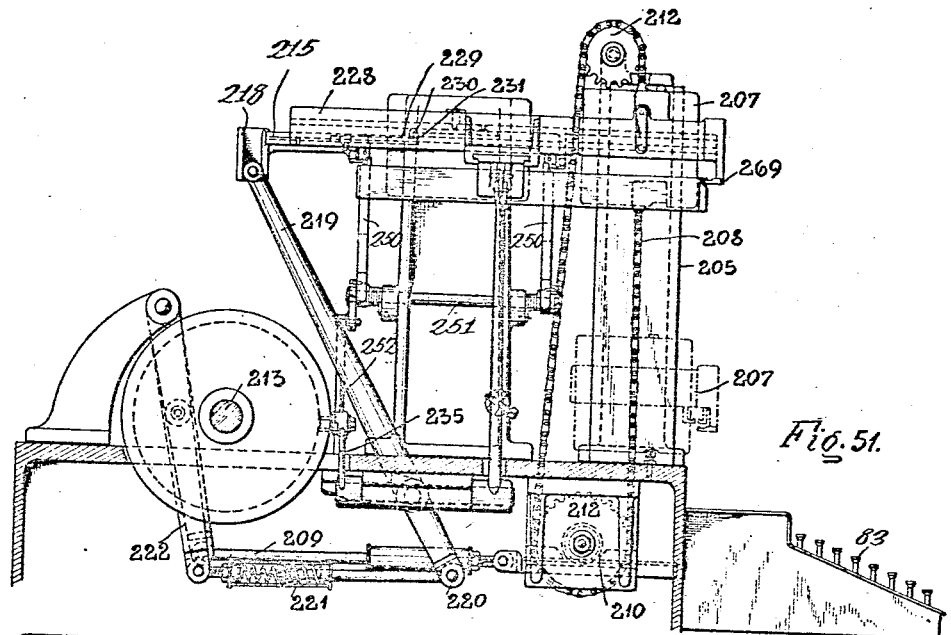
Figure 52:
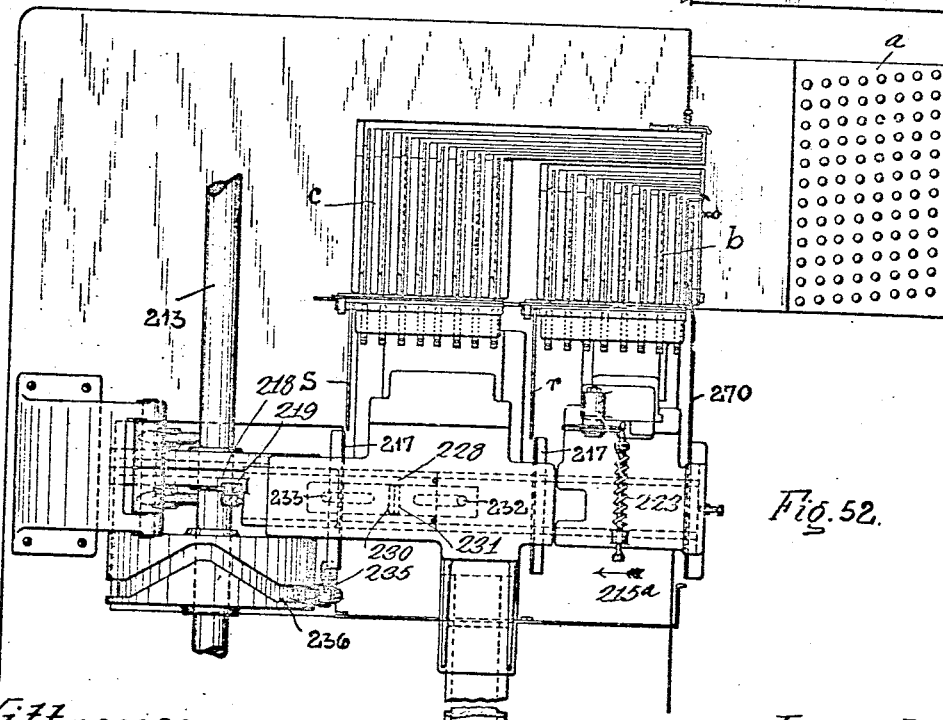
Figure 56:
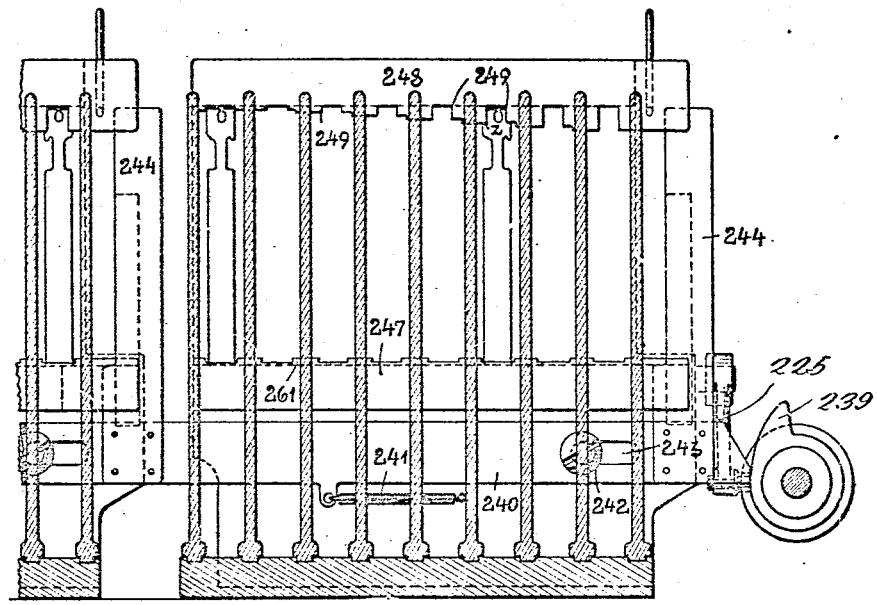
Figure 57:
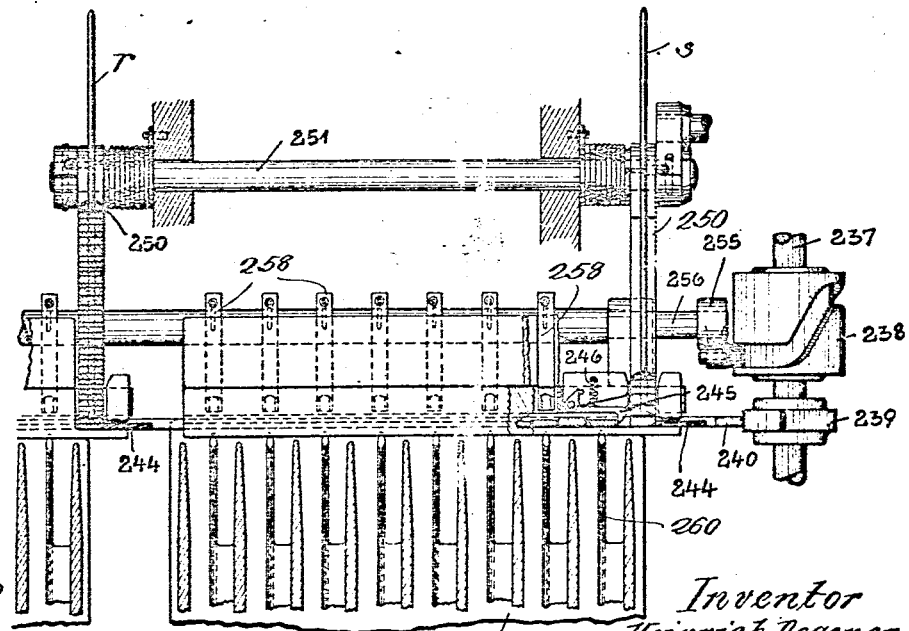
Figure 58:
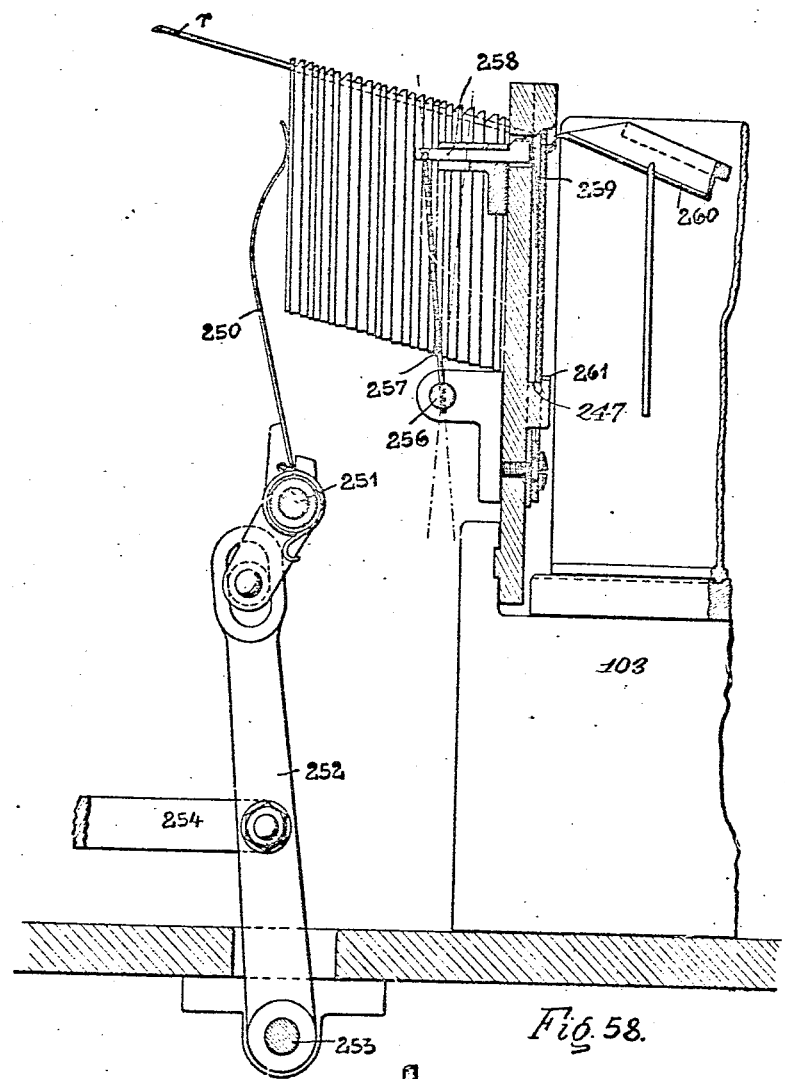
Figure 59:
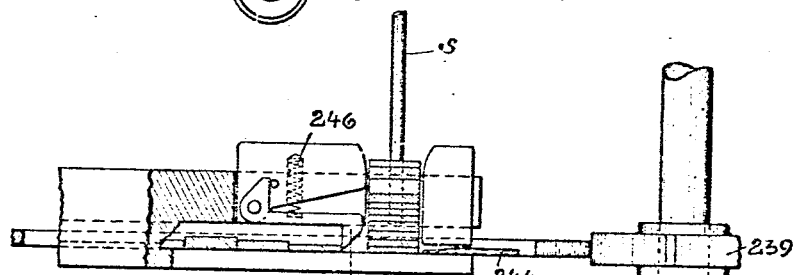

12 looking in the direction of the arrow 14 of Fig. 15 while Fig. 15 is a plan of the rear magazine, Fig. 16 is a separate side view of the key board illustrating the method in which the delivery gates are released, Fig. 17 is a plan of the key board shown in Fig. 16, Fig. 18 is a side view of the oscillator which is used for returning the delivery gates after the same have been released by depressing one of the keys in the key board, Fig. 19 is a front view looking from the left of Fig. 18, Fig. 20 is a plan of the oscillator device, Fig. 21 is a partial view illustrating a modified form of disengaging clutch for the oscillator, Fig. 22 is a detail view of the disengaging device, Fig. 23 illustrates a modified form of clutch in which friction members are employed instead of teeth, Fig. 24 illustrates one suitable construction of detaining device for bringing the matrix bar to rest on the stop bars, Fig. 25 is a section of the device shown in Fig. 24, Fig. 26 shows a modified form of device for lowering the matrix bars in which a matrix carriage shoe is employed, Fig. 26$^a$ is a diagram showing the method of actuating the device shown in Fig. 26, Fig. 27 shows a modified form of guiding means for the matrix bars from the magazines, Fig. 28 is a section on a line A—B of Fig. 27, Fig. 29 is a sectional view of the stop bars showing how the stop bars may be employed for detaining the matrix bars, Fig. 30 is a sectional view at right angles to the view shown in Fig. 29 showing two stop bars advanced as required to effect the detaining and stopping of a matrix bar, Fig. 31 illustrates a modified form of the stop bars shown in Figs. 27-30 in which the stop bars for one magazine may be, when desired, put out of operation, Fig. 32 is a section on a line A—B of Fig. 31, Fig. 33 illustrates the operation of the stop bars to effect the purpose of detaining and stopping the matrix bars, Fig. 34 is a sectional view at right angles to Fig. 30 and shows two stop bars advanced to effect the purpose required, Fig. 35 is a sectional front view of the end of the magazine showing an arrangement of guiding channels according to the present invention, Fig. 36 illustrates a modified form of guiding channel, Fig. 37 is an outside view looking from the left of Fig. 36, Fig. 38 is a plan view of a device shown in Fig. 36, Fig. 39 is a side view of the carriage during assembling for the matrix bars therein, Fig. 40 is a sectional view of the carriage and anvil showing an improved alining device according to the present invention, Fig. 41 is a plan view of the guiding and alining rails before the alining rail has been pushed forward and the guiding rail receded, Fig. 42 is a similar view showing the guiding rail receded and the alining rail advanced into the alining notch of the matrix bars, Figs. 43-46 illustrate modified forms of guiding and alining notches for the matrix bars, Fig. 47 illustrates a modified form of guiding and alining device in which a single bar is employed, Fig. 48 shows a further modified form of guiding and alining device in sectional elevation, Fig. 49 illustrates the same device in plan view, Fig. 50 is a front elevation of the distributer showing the carriage for lifting the matrix bars out of the line carriage after the line has been printed, Fig. 51 is a side view looking from the left of Fig. 50, Fig. 52 is a plan view of the distributer, Fig. 53 is a detail view of the elevating carriage illustrating how the elevating needle carrying bars are locked, Fig. 54 is a view looking from the left in Fig. 53 and showing the needles for leaving the matrix bars out of the line carrier after the matrix bars have been raised and before the needle carrying plates have been moved opposite the magazines, Fig. 55 is a detail view of the locking device for the needle carrying plates, Fig. 56 is a detail view showing how the matrix bars are distributed to their various compartments of the magazines, Fig. 57 is a plan view of the device shown in Fig. 56, Fig. 58 is an enlarged side view of the device shown in Figs. 56-57, Fig. 59 is an enlarged plan of said device, Fig. 60 is a front view of the device employed for ejecting the printed type bars into the galley, Fig. 61 is a side elevation of said device.

I shall first describe the machine generally with reference to Figs. 1 and 2. When a key in a key board $a$ is depressed a matrix bar is delivered from one or other of the magazines $b$, $c$ into an assembler $d$ from which the matrix bar is pushed by a piston or pusher into the line carriage $e$. After delivery of the matrix bars through channels $f$ and $g$, the delivery gate, by which this is effected and which is hereinafter more fully described, is returned by means of an oscillator $h$. The carriage $e$ is then moved by means of a lever $i$ to an anvil $j$ where according to the present invention the matrix bars are alined and the spacers pressed into position for adjusting the line after which molten metal is delivered by a pump $k$ into the mold in the anvil opposite which the required line of intaglio type has been brought. The cast line of type is then ejected by an ejector $m$ after being trimmed off into a galley $n$. Meanwhile the carriage $e$ with the line of matrix bars therein is moved into a position opposite a distributing device $o$ where the two kinds of type are raised on separate needles $p$ and $q$ into the elevated position shown in Fig. 1. After being raised the needles $p$ and $q$ are moved into the positions shown in Fig. 2 opposite sloping guide wires $r$ and $s$ respectively. A pusher $t$ is then moved to the right in Fig.

1 so as to push the matrix bars hanging from the needles $p$ and $q$ onto the sloping guide rails or needles $r$ and $s$. The matrix bars sliding down the wires $r$ and $s$ come opposite an assorting device $u$ by which they are returned to their correct chambers in the magazines $b$ and $c$.

*The matrix bars and spacers.*—Fig. 3 shows one set or font of matrix bars $v$ which are arranged to be stored in one of the magazines $b$ or $c$. The matrix bars $v$ are provided on a side $w$ with intaglio letters while on a side $x$ there are provided notches. In Fig. 3 on the upper end of the matrix bars there are provided hooks $y$ on the same side as the intaglio letters. There are illustrated eight different kinds of matrix bars which are of different thicknesses and which are also provided with differently formed heads. The distance from the bottom of the matrix bar to the hook $y$ is in all cases the same but the distance from the hook $y$ to the shoulder $z$ is different in each case. These differences being provided so as to enable the sorter hereinafter described with reference to Figs. 5, 6 and 7 to deliver the matrix bars into their proper chambers in the magazines. All the matrix bars are provided with a hole or notch 62 by which the bars are suspended on inclined wires within the respective chambers in the magazines in the usual manner. In Fig. 4 the hooks $y$ are arranged on the notched side of the matrix bars instead of on the side on which the intaglio letters are formed. Otherwise the matrix bars in Fig. 4 are the same as those described with reference to Fig. 3. It will be understood that the matrix bars in Fig. 4 are provided with a different kind of type and are arranged to be stored in a different magazine from the matrix bars shown in Fig. 3.

The spacer shown in Figs. 5 and 6 is of the known construction *i. e.* it consists of two band springs 63 riveted at one of their ends and between the free ends of which a wedge 64 provided with a hook 65 is adapted to move. The wedge 64 is, of course, provided with a slot 66 in which the band springs 63 can move.

*The magazine and matrix bar delivery mechanism.*—In Figs. 7 and 8 I have illustrated so much of a matrix magazine as is sufficient to show how the matrix bars may be guided while they fall from the chambers. The matrix bars $v$ are supported in channels 67 in the manner shown in Fig. 8 being suspended on sloping wires in said channels. Each of the channels 67 communicates with a channel 68 which extends to the front of the machine as can be seen in Fig. 2. Within the channels 68 and in the lower ends thereof there fit delivery gates 69 which are actuated in the manner hereinafter described. To the delivery gates there are fixed vertical arms 70 which act as pushers for the matrix bars arranged in the channels 68. The foremost matrix bar $v$ illustrated in dotted lines in Fig. 7 rests on the point 71 of the delivery gate over the delivery channel 72. It is usual in monoline machines to provide the channel 72 with a sloping wall for the purpose of guiding the matrix bar into the assembly room. In the form of my invention, however, illustrated in Figs. 7 and 8 the guiding channel 72 is continued parallel downward to the assembly room 73 and the partitions 74 of the channels 68 are provided with downwardly extending pieces 75 which are supported so as to slide in a wall 76 while the front parts of said partitions project into the channel 72 and form a vertical guide for the matrix bars falling through said channel. The extensions 75 are pushed forward by springs 77. Working within the assembly room 73 there is a piston 78 actuated from the oscillator in the usual way and the piston is provided with a projection $78^a$ having an inclined face adapted to co-act with the resiliently pressed extension pieces 75 for the purpose of pushing said extension pieces out of the path of the piston or pusher 78, when said piston is advanced in the usual way for the purpose of pushing a matrix bar onto the alining or guiding rail $79^d$. The operation of the stop bars 80 takes place when a key is depressed in the manner already known in connection with monoline machines.

The magazines $b$ and $c$ are arranged separately as shown in Figs. 10 and 11 so that they may be easily taken out of position and substituted by another magazine when required. The two magazines are shown as fixed in any convenient way to a common frame so that the front magazine $b$ which is of ordinary construction with its channels 66 lies within the angle of the rear magazine $c$ which is also of ordinary form and its channels 68. In this way a very compact arrangement of double magazine is obtained. The magazines each consist of boxes $b$ and $c$ divided by partition-walls into a number of chambers, eight in the form illustrated, in which the various bars are stored. The magazines are fixed by screws not illustrated to the platform 103 in Fig. 1 and means are provided for placing one or other of these magazines out of operation when desired. These means are shown in Fig. 11 and consist in a sliding cam piece 81 working under vertically slidable brackets $81^c$. These brackets carry the releasing levers 96 which are operated in the manner hereinafter described, with reference to Figs. 16 and 17. In this way the releasing levers 96 (see Figs. 9 and 11 where these levers are shown as broken off to enable the cam to be seen) belonging to the magazine containing the type which it is not desired to operate, are raised or lowered as required to put them out of operative position. The lower bracket on the right hand of Fig. 11 is in inoperative position as the levers 96 supported by this bracket do not come against the stops or catches 97 when moved. These stops are thus always held by their springs in position to retain the delivery gates 69 belonging to one of the magazines at rest. The slide 81 is operated from a handle 81ᵃ through linkage 81ᵇ (Figs. 16 and 17). Having by means of the slide 81 determined which of the magazines have to be used the operator now starts to operate upon the keys. When the operator presses a key 83 a lever 84 pivoted about a point 85 pushes, by means of an arm 86, a draw-bar 87. The draw-bar 87 is provided with projections 88 and 89. The projections 88 operate upon flags or levers 90 pivoted about 91 these pivots being connected by rods 92 with the stop-bars in a manner shown for instance in Figs. 27–30 or 31–34 and hereinafter described. One end of the rods 92 can be seen in Fig. 17 while the other end is to be seen in Figs. 27–30 or 31–34. The projections 89 operate on flags or levers 93 which cause the oscillation of pivots 94 to which there are connected levers 95 which effect the operation of the delivery gate release lever 96. The lever 96 when moved causes the release of the trigger 97 which catches in a projection 98 on one of the delivery gates 69. The delivery gate 69 having been released in the manner described with reference to Figs. 16 and 17 it now moves to the left in Fig. 9 under the action of a spring 99, being guided in the motion on pins 100 working in slots on the delivery gates. As can be understood when the delivery gate moves to the right in Fig. 9 a shoulder 101 on the delivery gate comes against a pivoted spring held lever 102 known as the accelerating lever. This lever extends to the front of the magazines over the entrance to the delivery channels so that when the delivery gate is moved to the right in Fig. 9 under the action of the springs 99 the accelerating lever 102 strikes against the matrix bar which has just lost the support of the point 71 of the delivery gate. As can be seen in Fig. 9 two sets of accelerating levers 102 are provided, one set for each of the magazines. As can be seen in Figs. 13 and 15 the delivery gates 69 are continued rearward of the machine for the same distance so as to come under the operation of the various relieving triggers 97 which are arranged co-axially. It can also be seen in Figs. 12–14 how the front magazine has its channels 66 closed to the supporting frame 103 while the rear magazine is provided with a side projecting part so as to leave a space 104 Fig. 14 between the bed plate 103 and the delivery gate frame 82.

Having now explained how the matrix is delivered when the key is depressed I will now proceed to describe how the oscillator works to effect the return of the delivery gate.

By means of a pulley 105 Fig. 2 the oscillator for restoring the delivery gate to its normal position is operated. The oscillator is shown in one form in Figs. 18 and 19. The pulley 105 is loosely mounted on a shaft 106 and its bush is provided with a toothed face 107 adapted to engage with a toothed face 108 formed on a sliding clutch 109 which is normally pressed by means of a spring 110 into engagement with the toothed face 107 on the pulley 105. The clutch 109 Fig. 19 is provided with a projection 111 see also Fig. 22 which is adapted to be operated upon by a lever 112 with an inclined face. The lever 112 is pivoted about the shaft 113 to which there is also pivoted a lever 114 which connects by means of a rod 115 with a bell crank lever 116, one arm 117 of which is acted upon by the delivery gate 69 which has been pushed back under the action of its springs 99. When therefore the delivery gate pushes the arm 117 the catch lever 112 is moved out of engagement with the projection 111 so that the spring 110 pushes the coupling 109 into engagement with the pulley 105. In this way the shaft 118 is rotated through one revolution in the direction shown by the arrow in Fig. 18 until the projection 111 once more comes opposite the slant face of the disengaging lever 112 and thereby the clutch is disengaged. When the shaft 118 rotates the cam 119 operates upon the roller 120 which is carried by the oscillator frame 121. The oscillator frame is thereby moved so that one of the projections 122 carried by said frame comes against the end of the delivery gate 69 and said delivery gate is restored to the position shown in Fig. 9 and the lever 116 is also restored to its original position. The projections 122 are pivotally carried by the oscillator frame and only that projection which comes against a delivery gate 69 is brought into operation.

Instead of employing a toothed clutch as shown in Fig. 19 I may employ a friction clutch as shown in Fig. 23 the actuating gear being exactly the same for both clutches. I may, however, also alter the operating gear in the manner shown in Figs. 21 and 22. This device consists of a disk 123 provided with a projection 124 which is adapted to engage in a corresponding recess on a sleeve 125 adapted to slide for a limited distance and to which the conical clutch 126 is fixed. A projection 11¹ is also carried by the sleeve 125, said projection being adapted to coact with a lever 112 in the manner described with reference to Fig. 18. A pawl 127 is provided so as to prevent the sleeve from rotating backward, when the lever 112 is moved out of the path of the projections 111.

By this means the sleeve 125 is disengaged in such a position that the point of the projection 124 is just about to enter the sloping edges of the groove on the sleeve 125 so that immediately the lever 112 is moved out of engagement with the projection 111 the sleeve 125 slides to the left in Fig. 21 and the clutch 126 engages with the pulley 105 which is of course loosely mounted. It will be understod that the sleeve 125 is connected by a pin passing through the shaft toward the pulley end against which pin the spring 128 bears. The pin 129 is then connected by through-going pins with the clutch 126.

Having now described how the oscillator returns the delivery gate 69 I will now proceed to describe the means by which the matrix bar is carried to the assembly room. According to the present invention this may be done in three ways in all of which the matrix bar instead of being acted upon by a spring pawl in the usual way is detained in a manner which is not calculated to cause so much wear on a matrix.

In Fig. 26 I have shown a modification in which the matrix bar $v$ falls on a shoe 130 and is caught by a spring pawl 131 which engages in the lowest notch 132 arranged on the same side of the matrix $v$ as the intaglio letters. After receiving the matrix bar $v$ the shoe 130 is moved by means of levers 133 and 134 until the foot 135 comes against a stop bar 80 which has been advanced by the action of the rod 92 when a key 83 was depressed. When the shoe 130 is brought to a stop the usual pusher is employed for pushing the matrix onto the alining rail in the carriage. The manner in which the lever 134 is moved is shown diagrammatically in Fig. 26$^a$. The lever 134 is pivoted to a bracket 264 and is connected by a spring connection 265 to a rod 266. This rod is connected to an oscillating lever 267 which is operated by a cam 268 on the oscillator shaft 118.

Instead of employing a shoe I may employ the device shown in Figs. 24 and 25. In this device three pawls 136, 137, 138 are employed which are arranged to steady the matrix bar by bearing only on the four lowest letters of the same. The pawls 136, 137, 138 are provided with extension pieces 139, 140, 141 against the first two of which levers 142, 143 bear. The levers 142 and 143 are pivoted at 144 and 145 respectively and are provided with extension parts which project over the faces of the lower stop bars 80 that is to say the lever 142 lies over the stop bars 80$^e$—80$^1$ while the lever 143 lies over the faces of the stop bars 80$^1$—80$^1$, when therefore one of the stop bars 80$^e$—80$^h$ is advanced only the lever 142 is oscillated and the pawl 136 is moved out of the path of the following matrix bar which will in consequence only be delayed or detained by the pawl 137. This detaining is necessary to prevent the matrix bar rebounding from the stop bar 80$^a$—80$^1$ on which it is to rest. It will be easily understood that if one of the stop bars 80$^1$—80$^1$ is advanced then both the levers 142 and 143 are oscillated and both the pawls 136 and 137 are withdrawn so that only the pawl 138 remains to act upon the falling matrix bar.

Instead of the forms of detaining device described with reference to Figs. 24 and 26 I prefer to employ the arrangements of detaining device illustrated in Figs. 27-30 or 31-34 together with the matrix guiding channels shown in these figures.

The various rods 92 Fig. 17 connect with cam levers 146 Fig. 28. The cam levers 146 are pivoted about the shaft 147 and are each provided with a ledge 148. The stop bars 80 are carried by a link 149 which connects with centrally pivoted levers 150. From the drawings it will be seen that the cam levers 146 and 148 are a short distance from the end of the levers 150 so as to leave an air space between by which actuation of the stop bars 80 by vibration of the machine is prevented. The cam levers 146 as can be seen in Figs. 27-30 are broad enough to operate two adjacent centrally pivoted levers 150, the ledge 148 coming opposite one of said levers while the highest part of the cam lever comes opposite the other of said levers. In this way it will be seen that when the rod 92 is moved by the depression of a key as described above and the cam lever 146 is moved, these stop bars 80 are moved out in the manner shown in Figs. 29 and 30 that is to say one of the stop bars is moved well into the channel through which the matrix bars fall while the other stop bar only moves a short distance forward and not sufficient to arrest the fall of the matrix bar. The outer edges of the stop bars 80 are beveled as shown at 151 so that the matrix bar slips over said bevel edge on the partially advanced stop bar and rests on the fully advanced stop bar. The partially advanced stop bar then slips into the lowest notch 132 of the matrix bar and prevents the same from springing back. The stop bars 80 in Figs. 27-30 are preferably made of two parts each pivoted to the lever 149 at 152, the outer edges of said pivoted parts being pressed by springs 153 while to the stop bars 80 projections 80$^a$ are provided which engage in notches on the other half of the stop bar. In this way the motion of the stop bars 80 is rendered possible in the manner described while said stop bars act resiliently. A spring pressed pin 154 is employed for depressing the levers 150.

Instead of the arrangement of stop bars shown in Figs. 27-30 I may employ the arrangement shown in Figs. 31-34, which operates in substantially the same manner. In Figs. 31-34, however, the stop bars 80 are carried by two levers 156 and 157 which connect with a yoke 158 connected by the link 159 with the centrally pivoted levers 150. In this form of stop bar operating device I provide means for putting one of the sets of stop bars out of operation. Thus I have shown in Fig. 32 the stop bars 80 corresponding to the channel g Fig. 31 as out of operation. This is effected by means of a slide 160 which consists of a plate having a central opening within which the levers 156 and 157 operate. The construction of this plate will be seen in Fig. 31 where its guides have been broken away to show the connection of the plate to the bell crank lever 161. The slide 160 is operated by a bell crank lever 161 which in turn is operated by a suitable lever 162. The slide 160 takes into a notch on the link 157. The stop bars 80 are pivoted about the points 152 and are provided with pins 163, which work in slots 164 on the levers 157, said stop bars being retained in the uppermost position by means of a flat spring 165. The operation of this device is otherwise substantially the same as that already described with reference to Figs. 27-30. After the matrix bar has been stopped by means of one of the projecting stop bars 80 in the manner described it is pushed on the alining bar and into the carriage by means of a pusher 78 which is operated by means of a lever 166, which is connected to the rod 167 which is operated by the oscillator, see Figs. 2, 19 and 38. In this way when the oscillator is operated in the manner hereinbefore described the fallen and stopped matrix bar is pushed onto the carriage in the usual way.

In the hitherto known monoline machines a drop channel such as f Fig. 27 with a sloping side 155 see Fig. 35 has been employed for guiding the matrix bars into the assembly room. When two sets of type, however, are used the angle of slope of the wall 155 would be too small to insure efficient delivery of the matrix bar. It would, of course, be possible to lengthen the funnel f, but such lengthening of the funnel f would not decrease the time of fall of the matrix bar. I have therefore shown and described above with reference to Figs. 7 and 8 a form of falling channel for the matrix bars in which the said channel is continued parallel from the delivery gates to the assembly room and continuation guiding walls 75 pressed by springs 77, see Figs. 7 and 8 are employed for guiding the matrix bars in their fall. Instead of such spring pressed guiding walls, however, I may employ the arrangement shown in Figs. 27-30 and 31-34. In these figures two funnels f and g are employed. These funnels being of the shape usually applied with monoline type setting and casting machines. It will be understood, however, that by employing two funnels in this way a difficulty is introduced in pushing the matrix bars from said funnels on to the alining rail. In Figs. 35-38 I have illustrated how this difficulty is overcome. In Fig. 35 the dividing partitions 155 and 168 are mounted resiliently and the pusher or piston 78 is provided at its upper end with a curved part 169 which forms a continuation of the sloping side wall 170 of the right hand channel g. In Figs. 37 and 38 it will be seen how the partition walls are resiliently mounted. The partition walls are held in an advanced position against the action of pins 171 pressed by springs 172. The pins 171 are acted upon on their external surfaces by levers $173^a$, $173^b$, $173^c$, which are operated by a rod 174 which is connected to the oscillator arm 175, as shown in Fig. 19, so that when the oscillator is moved the levers $173^a$, $173^b$, $173^c$, are moved from engagement with the pins 171 which move outward under the action of the springs 172 carrying with them the partition walls. The levers $173^a$ and $173^b$ are mounted pivotally in a bracket 173 while the lever $173^c$ is carried by a fork $174^a$ which is slidable on the pivot $174^b$. When this fork is moved upward in Fig. 37 the lever $173^c$ is moved away from engagement with the end of the pin corresponding to the wall 170 whereby this wall is held in the withdrawn position under the action of the liberated spring. It will be seen that all the levers $173^a$, $173^b$, $173^c$ are mounted on the same pivot and are of different length. In this way the lever $173^c$, when in operative position is first withdrawn from engagement with its pin and then the lever $173^b$ is withdrawn after which the last wall is allowed to be withdrawn from the path of the pusher 78. The partition walls and levers $173^a$, $173^b$, $173^c$ are operated by a rod 174 connected to a lever 175 Fig. 19. It will be seen that when the piston is moved from the position shown in Fig. 35 to the left that the matrix bar is supported in a practically vertical position while being pushed forward, also when the channel f only is being employed the wall 170 may be permanently withdrawn by means of the fork $174^a$ which may be connected to the operating gear for the change cam 81 (Fig. 11) by means of a rod $174^c$. When this wall is withdrawn the stroke and speed of the pusher 78 is also changed as hereinafter described. The spring rods 171 may also be released stagewise by providing the fork end of the rod 174 with a round hole engaging the end of the first pin i. e. the pin holding the partition 168 and oval holes engaging the pins of the levers 173 for the other partition walls. The pusher 78 pushes the matrix bar onto the assembly rail 79ᵃ which is held in the machine frame.

It will be understood that when only the drop channel f is employed a very considerable portion of the pusher stroke would be idle. In order to avoid this I arrange the actuating means for the pusher 78 so that the pusher may be given a different length of stroke corresponding to the drop channel with which it is for the time being operating. In order, however, with this increased length of stroke to avoid an unduly increased velocity I provide a speed reducing gear in which the reduced speed is transmitted to the cam driving shaft when the greatest length of stroke of the pusher is required. As shown in Fig. 38 the pusher 78 is operated by means of a lever 166 which is connected to a rod 167 which is extended toward the oscillator, see Figs. 2, 19 and 38. The rod 167 is operated by a pivoted lever 280 Fig. 20 provided with a roller 281 which is adapted to coöperate with one or other of the two cams 282 and 283. These cams are carried by a sleeve which is slidable by means of any suitable mechanism connected to the fork 284. As described above the shaft 118 is driven from a pulley 105. As shown in Fig. 20 this pulley is mounted on a counter shaft 285 on which there are also provided two wheels 286 and 287 of different diameters. These two wheels gear with corresponding wheels 288 and 289 on a shaft 118. A slide 290 provided with projections 291 and 292 is adapted at one end of its sliding motion to take into a notch on the boss of the wheel 287 in which case the larger of the two wheels forms the driving gear for the shaft 118, the toothed wheel 286 being in this case loose. This is the position illustrated in Fig. 20. It will be seen, however, that if the sleeve 290 is moved to the right in Fig. 20 the lower speed would be obtained and simultaneously therewith the cam 282 would be moved under the roller 281, so that the lower speed of revolution and the longer stroke of the pusher 78 would be obtained with practically the same velocity of the pusher as in the case of the short stroke.

The improved alining and guiding means for the matrix bar according to the present invention will now be described with reference to Figs. 39–49. The characteristic of the following guiding arrangements for the matrix bars is that the bars remain loose during the motion of the carriage from the assembling to the casting point and are not held firmly during this movement as is the case in McNamara's machine as described in his patent No. 847621. As described above the matrix bars are pushed onto the rail 79ᵃ, see Fig. 39. The rail 79ᵃ forms an assembling rail and is fixed to the frame of the machine. Further it is a loose fit for the guide notches in the matrix bars. A guide rail 79 is supported in the carriage and is arranged to take into the notch below that notch into which the assembling rail 79ᶜ takes. When the matrix bars have been assembled in the carriage in the usual way, this carriage is moved from the assembling to the casting point and the guiding rail comes into the position shown in Fig. 41. In this position the guide rail 79 comes against the projection 183 see Figs. 41 and 42 of a crank or eccentric 177, which is supported in the frame of the machine opposite the anvil or casting block. The crank 177 is also provided with a pin 178 which engages in a rail or plate 180 mounted in the machine frame and forming the alining rail. This alining rail is an exact fit for the guide notches in the matrix bars. The exact alining rail 180 is arranged in the anvil above the guiding rail 79 and is provided with slanting slots 181 in which fixed pins 182 take. When therefore the crank pin 178 is moved from the position shown in Fig. 41 to that shown in Fig. 42 the plate 180 is moved forward. Simultaneously therewith the rail 79 slides under the action of the projection 183 on the sloping guides 184 and is thereby withdrawn from the notches. In this way the guiding rail 79 is receded simultaneously with the advancing of the exact alining rail 180, this being effected at the casting position opposite the mold 185. After the line of matrix bars has been adjusted by operating the spacers in the usual way and the line of matrix bars and spacers have been locked by means of the usual locking arm 186 the molten metal is ejected from the pump k through a nozzle 187 so that the cast line of type is now ready. The carriage is then moved toward the left in Fig. 41 so as to cause the plate 79 to strike against a projection 188 by which the exact alining bar 180 is withdrawn and the guide bar 79 is advanced.

Instead of the device shown in Figs. 39–42 I may employ a guide rail and alining rail in one piece carried by the machine frame as shown in Fig. 47. In this case the part 189 forms the part of the rail on which the matrix bars are assembled. When the carriage is moved from the assembling position to the casting position the matrix bars slide over a part 190 which does not project so far into the notches of the matrix bar as the bar 189. Thus the friction between matrix bar and the guide rails is confined to the outer part of the notches so that these notches are not worn away which has been a source of great trouble because such worn away notches allow a considerable amount of play to the matrix bars and result in an inexact alining of the letters. When the carriage is moved opposite the casting point i. e. when it is moved to the anvil j, Fig. 1, the notches of the matrix bars take into the exact alining part 191 of the rail shown in Fig. 47. After casting and when the matrix bars are to be taken by the distributer and returned to the magazines the rail is receded in the usual way by means of a crank pin taking into a slot 192 by which the pins 193 sliding in the slanting slots 194 cause the receding of the alining rail in the usual manner.

Instead of employing a single rail as shown in Fig. 47 with a cut away part 190 I may employ a rail of constant breadth 195 as shown in Figs. 48 and 49 which rail is operated by means of a cam 196 Fig. 48 so as to take up three positions as shown in dotted lines in Fig. 49. For this purpose the cam 196 is provided with a groove which is set to three radii 197, 198 and 199 whereby the linkage 200 takes up three positions so as to effect the positioning of the rail 195.

In Figs. 3 and 4 I have illustrated matrix bars with the ordinary depth of guiding notch, in Fig. 43 however I have shown a form of matrix bars with a deeper notch 201 than is usually employed. The front part of said notch acts as a guiding part and may be used with the form of guiding rail shown in Figs. 47-48 in which only the outer part of the notch is used during guiding and therefore subjected to the greatest wear. It will be understood that the matrix bar shown in Fig. 43 is only one of a set such as illustrated in Fig. 3 or Fig. 4.

In Fig. 44 I have illustrated another form of guiding means for the matrix bar. In this form separate guiding and alining slots are provided and this form of matrix bar is conveniently used with an alining device such as illustrated in Figs. 39-42. The guiding notch 202 is rectangular and engages with the guiding rail 79 while the alining notch 203 is conical and engages with the alining rail 180, the engaging face of which is tapered so as to fit exactly into the tapered notch 203. It will be understood that the guide rail may be arranged to take into the tapered notch 203 and the alining rail into the rectangular notch 202.

In Fig. 45 I have illustrated a form of matrix bar in which separate guiding notches 204 are arranged on the same side of the matrix bar as the intaglio letters while the alining notches 201 are arranged on the rear of the matrix bar.

In Fig. 46 I have shown guiding notches similar to those shown in Fig. 45 but said guiding notches are in this case formed on the same side of the matrix bar as the alining notches 201.

*Distributer.*—After the bar has been cast in the manner already described with reference to Figs. 39-42 the carriage with the matrix bar therein is moved into a position opposite the distributer o. The distributer consists of a frame 205 having guide faces 206 on which there slides a carriage 207 operated by a chain 208 which is driven by a rod 209 adapted to move a sliding rack 210 gearing with a gear wheel 211 which is connected to the lower of the chain wheels 212. The rod 209 is operated by one of the cams on the driving shaft 213. The carriage 207 is provided with two sliding plates 214 and 215 which carry extensions 216 to which the needles or rails 217 which lift the matrix bars are fixed. The upper sliding plate 214 is extended to the front so as to cause its needle 217 to engage under the hook of those matrix bars in which the hooks are arranged to the exterior. The lower sliding plate 215 is arranged to engage those matrix bars in which the hooks y are arranged toward the interior of the machine and on the opposite side to those hooks engaged by the rail or needle carried by the slide 214. To the slide 215 there is fixed an open guide 218 in which a roller on a lever 219 engages, this lever being pivoted at the point 220 and operated by a spring rod 221 connected to a lever 222 operated by a cam on the driving shaft 213.

When the line of type has been cast and the carriage moved opposite the distributer o the line of matrix bars held in the carriage are liberated and the matrix bars are all brought to one level by means of the usual pusher plate for instance such as described in Wotherspoon No. 711143 U. S. patent. The leveling plate, however, in the present invention is arranged to bring all the hooks of the matrix bars into the same level. The carriage 207 is then in the position shown in Fig. 54 so that when the chain 208 is moved the open guide 218 slips over the roller on the end of the lever 219 and the carriage lowers into the position shown in dotted lines in Fig. 51. In this position the rails or needles 217 come into a position so that the matrix bars moved along by the carriage come with their hooks under the needles 217. The carriage 207 is then raised into the position shown in Fig. 54 and in rising a spring pressed pin 223 which during the upward motion of the carriage pressed in a groove 224 is raised on the slope 225 so as to pull a locking pin 226 out of engagement with a notch 227 in the lower sliding plate. The sliding plates 214 and 215 are now free to be moved in the direction of the arrow 215ª by means of the lever 219 from the carriage which now forms part of a rail 228 over which the plates are moved from the carriage or moving part 207. The lever 219 is by means of its cam now moved into the position shown in Fig. 51 so that the bottom plate 215 is slipped along the rail or guide 228. The upper plate 214, however, owing to the nature of its connection with the plate 215 is only moved so that its needle 217 comes into the position shown in Fig. 51 opposite the delivery needle r to the front magazine b Fig. 52. The connection of the two plates for effecting this purpose is as follows: Intermediate slotted links 229 provided with projections 230 and 231 slide over pins 232 and 233. In the slides 214 and 215 respectively. When the needles 217 have been moved into the extended position shown in Fig. 51 the matrix bars are pushed from the needles 217 by means of a pusher 234 seen most clearly in the top left hand of Fig. 50 operated by a lever 235 from a cam 236 on a driving shaft 213. In this way the correct matrix bars belonging to each of the magazines b and c are pushed onto their correct slanting rails r and s.

I will now describe with reference to Figs. 56—59 how the various matrix bars on the slanting rails r and s are assorted and returned into their correct compartments in the magazines b and c. In Figs. 56 and 57 only the magazine c is fully illustrated and the first compartment of the magazine b. As can be seen from Fig. 2 there is a driven counter shaft 237 which carries two cams 238 and 239 which cams are also illustrated in Figs. 56 and 57. The cam 239 is adapted to operate on an end of a draw-bar 240 which is held against the cam 239 by means of a spring 241 Fig. 56 and is guided in pins 242 working in slots 243. The draw-bar 240 is provided with vertical plates 244 each having a bevel front edge as seen in Fig. 57. This beveled front edge comes to a point sufficiently narrow to engage the narrowest of the matrix bars shown in Figs. 3 and 4. When the draw-bar 240 is reciprocated by means of the combined action of the cam 239 and the spring 241, the plate or pusher 244 pushes the matrix bars one by one from the end of the slanting rail s and these matrix bars pass the nose of a pawl 245 which is pressed by a spring 246 so that the matrix bars are pushed along a grooved rail 247 opposite the entrances to the various compartments of the magazine c. These compartments are provided at their upper end with a templet plate 248 having slots 249 therein of different depth corresponding to the various depth at which the shoulders z of the matrix bars shown in Fig. 1 are placed. Passing from the left toward the right in Fig. 3 the matrix bars are shown corresponding to the compartments shown from the left toward the right shown in Fig. 56. The line of matrix bars on the rails s and r are pushed downward by means of a spring 250. These springs are supported on a shaft 251 which is carried by two side frames which are adapted to be moved out of the path of the matrix bars, when these are pushed on to the rails r and s. This later motion is effected by means of a lever 252 pivoted about the point 253 and actuated by a draw-bar 254. For the purpose of pushing the matrix bars into their correct chambers the cam 238 Figs. 2 and 57 is provided which operates upon a lever 255 fixed to a shaft 256. This shaft is provided with a number of spring arms 257, see Fig. 58, which connect with pushers 258 arranged opposite the upper end of the matrix bars. After a matrix bar has been pushed by means of the plate 244 onto the rail 247 the shaft 256 is oscillated and the pushers 258 thereby brought against the upper end of matrix bars. These matrix bars being held against the face of the magazine by means of springs 259. In this way when a proper matrix bar comes opposite the entrance plate 248 with the grooves 249 the said matrix is pushed into its correct channel and slides down the wire or rail 260 as shown in Fig. 53. It will be understood that should the pusher 258 come against a matrix bar which is not opposite its correct channel the spring rod 157 yields and the matrix bar moves along the next time another matrix bar is pushed onto the rail 247. The rail 247 is preferably provided with elevations 261 to provide a better guiding of the matrix bars, when they are being pushed along by succeeding matrix bars. The spacers in the above described carriage are lifted by means of a rail or needle 269 and are pushed by the pusher onto a slanting guiding rail 270 and so led into the proper chamber into the magazine, Figs. 50 and 51.

The ejector conveniently employed is shown in detail in Figs. 60 and 61 in which the mold is carried by a segment 262 pivoted about a point 263. Fig. 60 shows a view looking on the front of the machine and the position of the molding slot during casting is shown by dotted lines 271. After the mold has been cast the segment 262 is moved into the position shown in full lines in Fig. 60 in which case the molding slot 271 is vertical as Fig. 60 represents an elevation looking in the direction of the arrow 272 in Fig. 61. In this position the molding slot comes opposite an ejector 273 operated by a link 274 which is in turn operated by a cam 275 on the driving shaft. The ejector 273 pushes the matrix bar from the molding slot 271 through a box 276 having cutting faces in the front end therof by which the cast line of type is dressed off. The segment 262 is then returned to its original position and simultaneously a rod 277 is operated in any convenient way by which a lip 278 rotates so as to deliver the cast line of type 279 into the galley containing the other already cast lines of type. In this way the type bars are not allowed to fall whereby they might be damaged but are delivered without being ill treated into the galley.

It will be understood that by monoline type setting and casting machines only such machines are referred to in which the letters are carried by matrix bars which are provided with a number of letters and these matrix bars are delivered in proper position to a carriage in which they are conveyed to a casting point. In such machines so far as I am aware the machine parts have only been arranged to operate with one set of type. The foregoing description it is thought is sufficient to explain the nature of the present invention and how it may be fully carried into effect to those engaged in the art of making such monoline type setting and casting machines.

Having thus fully described the nature of my invention, what I desire to secure by Letters Patent of the United States is:—

1. In monoline type setting and line casting machines, in combination with the delivery and casting mechanism, two sets of matrix bars with different type thereon each of said bars having a plurality of intaglio letters on one side and a plurality of notches on the other and means for distinguishing the bars belonging to each set comprising hooks on said bars arranged on opposite sides of the bars on each set.

2. In monoline type setting and line casting machines, in combination with the delivery and casting mechanism, two sets of matrix bars with different type thereon each of said bars having the same overall length and provided with a plurality of intaglio letters on one side and a plurality of notches on the other and means for distinguishing the bars belonging to each set comprising hooks on said bars arranged on opposite sides of the bars on each set.

3. In monoline type setting and line casting machines in combination with the delivery and casting mechanism, matrix bar sets each set having a different kind of type and each bar carrying a plurality of different letters, a plurality of chambered magazines each magazine storing the types of one set and each chamber in said magazine storing a plurality of similar matrix bars, means for distinguishing the bars belonging to each set and magazine comprising differently arranged suspension hooks on said matrix bars and means for distinguishing the similar matrix bars belonging to any given chamber comprising differently shaped heads on the bars for each chamber.

4. In monoline type setting and line casting machines in combination with the delivery and casting mechanism, matrix bar sets each set having a different kind of type and each bar being of the same overall length and carrying a plurality of different letters, a plurality of chambered magazines, each magazine storing the types of one set and each chamber in said magazine storing a plurality of similar matrix bars means for distinguishing the bars belonging to each set and magazine comprising differently arranged suspension hooks on said matrix bars and means for distinguishing the similar matrix bars belonging to any given chamber comprising differently shaped heads on the bars for each chamber.

5. A double matrix bar magazine for monoline two type setting and line casting machines having the storage chambers of each magazine arranged in separate casings, delivery channels for each of said magazines at right angles to said chambers, the storage chambers and delivery channels of one magazine being arranged within the angle between the storage chambers and delivery channels of the other magazine.

6. In a monoline two type setting and line casting machine, a double magazine comprising two sets of storage chambers for the matrix bars, two sets of delivery channels, said sets of delivery channels being arranged side by side, delivery gates in said channels, said delivery gates being extended rearwardly of the channels to one line for the purpose to be actuated upon all delivery gates relatively at the same place.

7. In monoline multi-type setting and line casting machines in combination with the delivery mechanism and the operating key board, a plurality of sets of type and magazines for storing said sets, delivery gates for the bars in said magazines, and means for bringing the delivery gates of one or other of the magazines into operative connection with the keyboard mechanism as desired comprising release levers for said delivery gates, slidable brackets supporting the release levers for each of the sets of delivery gates and a movable cam coacting with said brackets to bring the controlling levers into or out of coöperation with the keyboard mechanism.

8. In monoline type setting and line casting machines means for stopping a matrix bar falling from the magazine in correct position comprising in combination with the key-board, a pivoted shaft operated by the depression of a key, stop bars moved into the path of said falling matrix bar, links connecting said pivoted shaft to the stop bars.

9. In monoline type setting and line casting machines, key-board actuated means for releasing a matrix bar and stopping it in correct position comprising releasing mechanism for said matrix bars, pivoted shafts from which said releasing mechanism is operated, stopping mechanism for said released matrix bar, pivoted shafts from which said stopping mechanism is operated, a draw-bar operated from the key-board and adapted to actuate said pivoted shafts.

10. In monoline type setting and line casting machines, key-board actuated means for releasing a matrix bar and stopping it in correct position comprising releasing mechanism for said matrix bars, pivoted shafts from which said releasing mechanism is operated, stopping mechanism for said released matrix bar, pivoted shafts from which said stopping mechanism is operated, bell crank levers 84—86 connected to the key-board, a draw-bar 87 operated from said bell crank lever, projections 88 and 89 on said draw-bar, arms 90, 93 connected to the pivoted operating shafts and co-acting with said stops.

11. In monoline type setting and line casting machines, an oscillator for returning released delivery gates to their initial position comprising an oscillating frame, a continuously rotating driving member, an operating shaft for the oscillating frame, axially sliding clutch means brought into gear by a released delivery gate for coupling said operating shaft to said driving member.

12. In monoline type setting and line casting machines, an oscillator for returning released delivery gates to their initial position comprising an oscillating frame, a continuously rotating driving member, an operating shaft for the oscillating frame, axially sliding clutch means brought into gear by the released delivery gate for coupling said operated shaft to said driving member, said clutch means comprising a toothed face on the constantly rotating member, a slidably mounted sleeve on the operating shaft having teeth adapted to co-act with the teeth on the constantly driven member.

13. In monoline type setting and line casting machines, an oscillator for returning released delivery gates to their initial position comprising an oscillating frame, a continuously rotating driving member, an operating shaft for the oscillating frame, an axially sliding clutch comprising a toothed face on the constantly driven member, a spring pressed slidably mounted sleeve on the operating shaft having teeth adapted to co-act with the teeth on the constantly driven member, means for holding said clutch normally out of gear against the action of the spring, means operated by the released delivery gate for releasing said clutch holding means.

14. An oscillator for use in monoline type setting and line casting machines comprising a driving shaft, an oscillator frame, an operating shaft for said frame, a sliding coupling on said operating shaft, a spring normally pushing said sliding coupling into engaging position, a projection on said sliding coupling, a pivoted stop engaging said projections to hold the clutch out of engagement against the action of the spring, means for oscillating said pivoted stop so as to move it out of the path of said projection whereby the sliding clutch member is under the action of the spring moved axially into engagement with the driving shaft.

15. An oscillator for use in monoline type setting and line casting machines comprising a driving shaft, an oscillator frame, an operating shaft for said frame, a sliding coupling on said operating shaft, a spring pressing said coupling into engagement with the driving shaft, a projection on said coupling, a pivoted stop having a sloping engaging end coöperating with said projection during rotation of the shaft to move the projection and coupling axially against the action of the spring, means for oscillating said pivoted stop so as to move it out of the path of said projection whereby the sliding clutch member is under the action of the spring moved axially into engagement with the driving shaft.

16. In combination notched matrix bars, drop channels through which said notched matrix bars fall, retarding and stopping means in said channels comprising resiliently mounted stop bars arranged one above the other and movable in pairs into said channel, one member of said pairs resiliently engaging the lowest notch of the matrix bar while the other member of said pairs intercepts the fall.

17. In combination notched matrix bars, drop channels through which said notched matrix bars fall, retarding and stopping means in said channel comprising resiliently mounted stop bars arranged one above the other on one side of the channel and movable into the same, means for pushing two adjacent stop bars into the channel the lower of said stop bars being pushed sufficiently far into the channel to stop the falling matrix bar while the upper of said stop bars only advances sufficiently to resiliently engage the lowest notch in the matrix bar.

18. In combination, notched matrix bars, drop channels through which said notched matrix bars fall, retarding and stopping means in said channel, resiliently mounted stop bars having beveled edges, said stop bars being arranged one above the other on one side of the channel, means for pushing two adjacent stop bars into the channel, the lower of said stop bars being pushed sufficiently far into the channel to stop the falling matrix bar while the upper of said stop bars only advances sufficiently to resiliently engage the lowest notch in the matrix bar.

19. In combination with notched matrix bars and a drop channel through which said notched bars fall, intercepting and retarding means for falling bars comprising resiliently mounted stop bars arranged one above the other on one side of the channel and movable into said drop channel, operating levers for said matrix bars, cam bars adapted to coact with adjacent pairs of levers, low and high cam surfaces on said cam bars, each of said surfaces co-acting with a different lever for the purpose set forth.

20. In combination with matrix bars and a drop channel through which said matrix bars fall, stop bars arranged one above the other on one side of the channel and movable into said channel, operating links to which said stop bars are pivoted at one end, springs pressing the other end of said stop bars into the drop channel, centrally pivoted levers connected at one end to said operating links, cam levers operating on the other end of adjacent pairs of centrally pivoted levers, said cam levers having a high cam surface acting on the lower member of an adjacent pair and a low cam surface acting on the higher member of an adjacent pair of the centrally pivoted levers.

21. In combination, notched matrix bars, guiding drop channels through which said matrix bars fall, an assembly room to which all said drop channels lead, stop bar parts for each channel, said stop bars being arranged one above the other on one side of the channel, actuating links to which said stop bar parts are pivoted, means for simultaneously actuating an adjacent pair of links so that the upper link of said pair does not move so far forward as the lower.

22. In combination, notched matrix bars, two drop channels through which said matrix bars fall, separately movable stop bars for each drop channel, common actuating means for the stop bars in both channels, and means for rendering said common actuating means effective for the stop bars belonging to one channel only.

23. In combination, notched matrix bars, guiding drop channels through which said matrix bars fall, an assembly room to which all said drop channels lead, stop bar parts for each channel, actuating links to which said stop bar parts are pivoted, means for simultaneously actuating an adjacent pair of links so that the upper link of said pair does not move so far forward as the lower comprising, a set of separate carrying links for the stop bars of each channel, a yoke joining pairs of carrying links at the same level, actuating means for said yoke, means for holding one of said sets of carrying levers, the connection of said held carrying links with the yoke then becoming the pivot for the yoke when operating another set.

24. In combination, matrix bars, a compound magazine in which said matrix bars are stored, drop channels leading from the delivery end of said magazines through which said matrix bars fall, stop bars arranged one above the other in each channel, separate sets of links (156 and 157) carrying the stop bars for each channel, a side extension on each of said links to which said stop bars are pivoted, a pin carried by each of said stop bars and working in curved slots (164) in the links, a spring pressing said pin against the interior end with respect to the channel of said slot.

25. In combination, two sets of matrix bars each set having a different kind of type, two nested magazines in each of which the matrix bars carrying one kind of type are stored, a plurality of drop channels leading from the delivery end of said magazines, a common assembly room to which said drop channels lead, movable partition walls for said drop channels and a common pusher for pushing matrix bars past said movable partitions into the assembly room.

26. In combination, two sets of matrix bars, two magazines the one nested within the other and in each of which the bars of one set of matrix bars are stored, two drop channels leading one from the delivery end of each of said magazines and an arresting chamber to which said drop channels lead, movable partition walls on the ends of said channels, a common assembly room and a common assembly pusher for pushing matrix bars delivered into said arresting chamber and past the movable partitions into said common assembly room.

27. In combination matrix bars containing two sets of type, a compound magazine in the elements of which said sets of type are stored, two drop channels leading one from the delivery end of each of the elements of the compound magazine, a common pusher for the matrix bars delivered from both drop channels, means for changing the stroke of said pusher according to the channel with which it is coöperating.

28. In combination matrix bars containing two sets of type, a compound magazine in the elements of which said sets of type are stored, two drop channels leading one from the delivery end of each of the elements of the compound magazine, a common pusher for the matrix bars delivered from both drop channels, means for changing the stroke of said pusher according to the channel with which it is coöperating, a curved upper end on said pusher corresponding to the shape of the drop channel, said pusher at the end of each of its strokes forming part of the partition walls of that channel with which it is operating.

29. In combination matrix bars containing two sets of type, a compound magazine in the elements of which said sets of type are stored, two drop channels leading one from the delivery end of each of the elements of the compound magazine, a common pusher for the matrix bars delivered from both drop channels, actuating means for said pusher and means for changing the speed of the actuating means of said pusher according to the channel with which it is to work.

30. In combination, matrix bars containing two sets of type, a compound magazine in the elements of which said sets of type are stored, two drop channels leading one from the delivery end of each of the elements of the compound magazine, a common pusher for the matrix bars delivered from both drop channels, means for changing the stroke and maintaining the velocity of said pusher constant according to the channel with which it is to work.

31. In combination, matrix bars containing two sets of type, a compound magazine in the elements of which said sets of type are stored, two drop channels leading one from the delivery end of each of the elements of the compound magazine, a common pusher for the matrix bars delivered from both drop channels, means for changing the stroke and maintaining velocity of said pusher constant according to the channel with which it is to work, comprising a change speed driving gear for said pusher, a double operating cam co-acting with the driving gear, said cam being arranged at the highest speed to give the shortest motion to the piston.

32. In combination, matrix bars, a magazine in which said bars are stored, a plurality of drop channels from the delivery end of said magazine movable partition walls on said drop channels, a common assembly room to which said matrix bars are fed from said drop channels, a pusher pushing matrix bars from said drop channels into said common assembly room, means for successively moving said movable partitions out of the path of the pusher moving past the same, for the purpose described.

33. In monoline type setting and line casting machines in combination with the assembling and casting mechanism, notched matrix bars, an assembling rail onto which said matrix bars are loosely passed by the assembling mechanism, a carriage conveying the assembly bars from the assembling to the casting point, a guide rail engaging loosely in the notches of the matrix bars during the motion of the carriage and an exact alining rail coöperating with the notches of the matrix bars at the casting point.

34. In monoline type setting and line casting machines in combination with the assembling and casting mechanism, notched matrix bars, a fixed assembly rail receiving said notched matrix bars from the assembling mechanism, a carriage for transporting said assembled matrix bars from the assembling to the casting point, a guide rail on said carriage engaging loosely in the notches of the assembled matrix bars during motion of the carriage, an alining rail fitting exactly in the notches of the matrix bars and engaging with the same after the carriage has transported the matrix bars to the casting point.

35. In monoline type setting and line casting machines in combination with the assembling and casting mechanism, matrix bars each provided with a plurality of notches, an assembling rail engaging loosely in the notches of said bars as they are delivered from the assembling mechanism, a carriage for transporting the matrix bars from the assembling to the casting point, a guiding rail carried by said carriage and adapted to loosely engage in the notches of the matrix bar below those in which the assembling rail engages, an alining bar adapted to fit exactly into the notches of the matrix bars and arranged at the casting point and means for withdrawing the loose fitting guiding rail and advancing the exact fitting alining rail into engagement with the notches of the matrix bars when the same have been moved into casting position.

36. In combination, a row of matrix bars of two kinds containing two kinds of type, said different kinds of type being arranged on different shaped matrix bars, a multi-chamber magazine for each kind of type each chamber of said magazine containing a differently shaped matrix bar means for removing said matrix bars from the row and returning them to their correct magazine chambers, an elevator for lifting the bars belonging to each kind of type, a pusher delivering said elevated bars to their correct magazines, an assorter for delivering said separate bars of each kind to their correct magazine chambers.

37. A distributer for the matrix bars of monoline type setting and line casting machines having a vertically movable carriage adapted to raise the matrix bars out of their carriage, a plurality of needles on which the different kinds of bars in the carriage are supported, slides in the carriage carrying said needles, means for moving said slides to different places outside the carriage, said different places corresponding to the desired delivery point for the matrix bars carried by said slides.

38. A distributer for the matrix bars of monoline type setting and line casting machines having a vertically movable carriage adapted to raise the matrix bars out of their carriage, a plurality of needles on which the different kinds of bars in the carriage are supported slides in but movable out of said carriage, carrying said needles, means for moving said slides to different places, said different places corresponding to the desired delivery point for the matrix bars carried by said slides, pusher means for pushing said matrix bars from the needles.

39. In combination a vertical frame with guide faces thereon, a carrier moving on said frame a plurality of sliding carrier plates supported in said carrier means for sliding said carrier plates from the carriage and relatively to one another.

40. In combination a vertical frame with guide faces thereon, a carrier moving on said frame, a plurality of sliding carrier plates in said carrier, means operable at one end of the motion of the carrier for sliding said carrier plates from the carriage and relatively to one another.

41. In combination with the frame of a monoline type setting and line casting machine, a vertical frame with guide faces thereon, a carrier movable on said frame, carrier plates detachably supported in said carrier frame, locking means for said carrier plates, means operated by the motion of the carrier toward one end of its course for releasing said locking means, means operable when said plates are released for sliding said plates from the carrier and relatively to one another.

42. In combination with the frame of a monoline type setting and line casting machine, a vertical frame having guide faces thereon, a carrier movable on said frame, two slidable carrier plates supported in said frame, a joining link for said plates, said joining link having projections working in slots in said plates a guide on one of said plates, an oscillating lever engaging in said guide at one end of the motion of said carriage.

43. In combination with the frame of a monoline type setting and line casting machine, a vertical frame having guide faces thereon, a carrier movable on said guide faces, means for moving said carrier comprising chains connected to said carrier, chain wheels over which said chains pass, a toothed wheel driving one of said chain wheels, a rack gearing with said toothed wheel, means for sliding said rack.

44. In combination with the frame of a monoline type setting and line casting machine, a vertical frame having guide faces thereon, a carrier slidable on said frame means for sliding said carriage, carrier plates in said carriage, locking means for said carrier plates, joining links for said carrier plates, said joining links having projections working in slots in said carrier plates, a guide in one of said carrier plates, an oscillating link operably connected to said guide at one end of the motion of the carriage, means for unlocking the carrier plate locking device before said guide and oscillating link are operatively connected.

45. In combination with the frame of a monoline multi-type setting and line casting machine, means for returning matrix bars after casting to their correct magazine chambers comprising separating means for the different matrix bars containing the different types, guiding means leading to the magazines containing each set of type, means for bringing said separated types in line with said guiding means, means for pushing said sets into the guiding means, means for subsequently assorting said sets into their various groups.

46. In combination with a matrix carriage having matrix bars therein with supporting hooks on said matrix bars arranged in opposite direction, means for removing said matrix bars from said carriage so that the matrix bars with the hooks in one direction are moved to a different point than the matrix bars with the hooks in the opposite direction.

46. In combination with a matrix carriage magazines each having a plurality of chambers therein and hooked matrix bars in said chambers the hooks of the matrix bars in one magazine being oppositely arranged to those of the other magazine and the matrix bars in each chamber being different in shape, of means for removing assorted matrix bars from a row of the same and returning them to their respective chambers in the various magazines comprising means for separating the matrix bars of one magazine from those of the other magazine, sloping wires receiving said separated sets, an assorting device taking the individual bars of a set and returning same to their respective chambers.

48. In combination with a row of differently shaped matrix bars, assorting means for said bars comprising, a pusher pushing separate bars from the row, a guide in which said separate bars move, storage chambers for the various matrix bars, entrance gates to said chambers corresponding to the shape of the matrix bars, means for resiliently pushing said matrix bars in the guide against the entrance gates.

49. In combination with a row of differently shaped matrix bars of various thickness, assorting means for said bars comprising a pusher having a beveled pushing edge corresponding to the thinnest matrix bar, said pusher being arranged to push separate bars from the row, a guide in which said separate bars move, storage chambers for the various matrix bars, entrance gates to said chambers corresponding to the shape of the matrix bar, means for resiliently pushing said matrix bars in the guide against the entrance gates.

50. In combination, a row of matrix bars having differently shaped heads, a slanting rail on which said matrix bars are resiliently pressed downward, a beveled edged pusher reciprocating at the end of the sloping rail and arranged to engage separate matrix bars, a guide receiving said pushed matrix bars, a row of chambers opposite the entrance to which said guide runs, a templet plate on the upper side of said chamber, said plate corresponding to the shape of the different matrix bar heads, means for resiliently pushing the matrix bar heads against the openings in said plate.

51. In combination, a row of matrix bars having differently shaped heads, a slanting rail on which said matrix bars are resiliently pressed downward, a beveled edged pusher reciprocating at the end of the sloping rail and arranged to engage separate matrix bars, a guide receiving said pushed matrix bars, a detent pawl holding pushed forward matrix bars in said guide during the return motion of the pusher, a row of chambers opposite the entrance to which said guide runs, a templet plate on the upper side of said chamber, said plate corresponding to the shape of the different matrix bar heads, means for resiliently pushing the matrix bar heads against the openings in said plate.

52. In combination with sets of matrix bars having different type, separate storing chambers for each set, a feed rail to each magazine, a reciprocating bar extending opposite the chambers of all the magazines pusher plates on said bar one for each magazine and co-acting with the matrix bars fed by the feed rail, a guide rail onto which said matrix bars are pushed, means for assorting matrix bars pushed along the guide rail into their correct chambers.

53. In combination with sets of matrix bars having different type, separate storing chambers for each set, a feed rail to each magazine, a reciprocating bar extending opposite the chambers of all the magazines, pusher plates on said bar one for each magazine and co-acting with the matrix bars fed by the feed rail, a guide rail onto which said matrix bars are pushed, means for assorting matrix bars pushed along the guide rail into their correct chambers, resilient pushers arranged opposite the entrance to each chamber in all the magazines, a common shaft by which said pushers are actuated so as to press resiliently against the pushed forward matrix bars on the guide and return said bars to their correct chambers.

54. In combination, a chambered magazine, a guide extending opposite the entrance to said chambers, assorted matrix bars in said guide, means for storing matrix bars of only one sort in each chamber of the magazine comprising a templet plate with openings therein over the entrance to the chambers, means for successively trying the matrix bars in the guide into the openings of the templet plate, for the purpose set forth.

55. In combination, a chambered magazine, a guide extending opposite the entrance to said chamber, assorted matrix bars in said guide, means for storing matrix bars of only one sort in each chamber of the magazine comprising a templet plate with openings therein over the entrance to the chambers, means for successively trying the matrix bars in the guide into the openings of the templet plate comprising an oscillating shaft, resilient levers carried by said shaft, pushers carried by said levers, said pushers being arranged one opposite each opening in the templet plate and adapted to act on the matrix bars in the guide.

In witness whereof I have hereunto set my hand in the presence of two witnesses.

HEINRICH DEGENER.

Witnesses:
HENRY HASPER,
WOLDEMAR HAUPT.